US012225533B2

(12) United States Patent
Huang et al.

(10) Patent No.: US 12,225,533 B2
(45) Date of Patent: Feb. 11, 2025

(54) COMMUNICATION APPARATUS AND COMMUNICATION METHOD FOR CONTROL SIGNALING

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 367 days.

(21) Appl. No.: 17/770,593

(22) PCT Filed: Sep. 10, 2020

(86) PCT No.: PCT/SG2020/050522
§ 371 (c)(1),
(2) Date: Apr. 20, 2022

(87) PCT Pub. No.: WO2021/091482
PCT Pub. Date: May 14, 2021

(65) Prior Publication Data
US 2022/0295468 A1    Sep. 15, 2022

(30) Foreign Application Priority Data
Nov. 7, 2019    (SG) .......................... 10201910444Q

(51) Int. Cl.
*H04W 72/23*    (2023.01)
*H04W 72/0453*    (2023.01)
(Continued)

(52) U.S. Cl.
CPC ....... *H04W 72/20* (2023.01); *H04W 72/0453* (2013.01); *H04W 84/12* (2013.01)

(58) Field of Classification Search
CPC . H04W 72/20; H04W 72/0453; H04W 84/12; H04W 72/23
See application file for complete search history.

(56) References Cited

U.S. PATENT DOCUMENTS 10,742,472 B1 *    8/2020    Van Nee ................. H04L 27/36
2017/0332323 A1    11/2017    Yang et al.
(Continued)

FOREIGN PATENT DOCUMENTS

GB    2561918 A    10/2018
JP    2017022702 A    1/2017
(Continued)

OTHER PUBLICATIONS

3GPP TSG-RAN WG2 Meeting#107, R2-1908790 Title:System information enhancements for NR-U (Year: 2019).*
(Continued)

*Primary Examiner* — Faruk Hamza
*Assistant Examiner* — Abusayeed M Haque
(74) *Attorney, Agent, or Firm* — Seed IP Law Group LLP

(57) ABSTRACT

The present disclosure provides communication apparatus and communication method for control signaling. A communication apparatus comprises circuitry which, in operation, generates a transmission signal comprising a plurality of user fields and a data field, the data field comprising a plurality of resource units (RUs); a transmitter, which, in operation, transmits the generated transmission signal; wherein a single transmission scheme is applied to one or more RUs of the plurality of RUs, which are assigned to another communication apparatus; and wherein one or more user fields of the plurality of user fields are addressed to the
(Continued)

another communication apparatus and a number of the one or more user fields addressed to the another communication apparatus is equal to a number of the one or more RUs assigned to the another communication apparatus; and the one or more user fields addressed to the another communication apparatus correspond to the one or more RUs assigned to the another communication apparatus respectively.

8 Claims, 22 Drawing Sheets

(51) Int. Cl.
*H04W 72/20* (2023.01)
*H04W 84/12* (2009.01)

(56) References Cited

U.S. PATENT DOCUMENTS

| | | |
|---|---|---|
| 2018/0205441 A1 | 7/2018 | Asterjadhi et al. |
| 2018/0324685 A1 | 11/2018 | Patil et al. |
| 2019/0215884 A1* | 7/2019 | Patil .................... H04W 74/004 |
| 2019/0334590 A1 | 10/2019 | Son et al. |
| 2020/0077272 A1* | 3/2020 | Bahr .................... H04W 12/122 |
| 2020/0112910 A1* | 4/2020 | Cherian ............. H04W 72/0446 |
| 2020/0163118 A1* | 5/2020 | Huang .............. H04W 74/0858 |

FOREIGN PATENT DOCUMENTS

| | | |
|---|---|---|
| WO | 2017/196731 A1 | 11/2017 |
| WO | 2018/128530 A1 | 7/2018 |

OTHER PUBLICATIONS

3GPP TSG-RAN3 Meeting#103bis, R3-191602 Title:Discussion on the bearer type selection hosted by SN (Year: 2019).*

Extended European Search Report, dated Nov. 3, 2022, for European Patent Application No. 20884682.4. (8 pages).

IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Std 802.11™-2016 (Revision of IEEE Std 802.11-2012), 2016 (3534 pages).

International Search Report, mailed Dec. 16, 2020, for International Application No. PCT/SG2020/050522, 3 pages.

* cited by examiner

| CBW (MHz) | | L |
|---|---|---|
| 20 | 1 | 2 |
| 40 | 1 | N.A. |
| 80 | 2 | 1 |
| 80+80, 160 | 2 | 2 |
| 160+160, 320 | 2 | 2 |
Fig. 2B
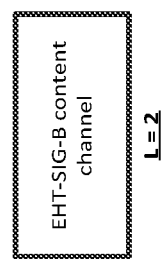
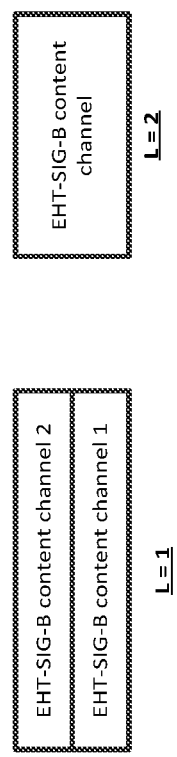
Fig. 2C

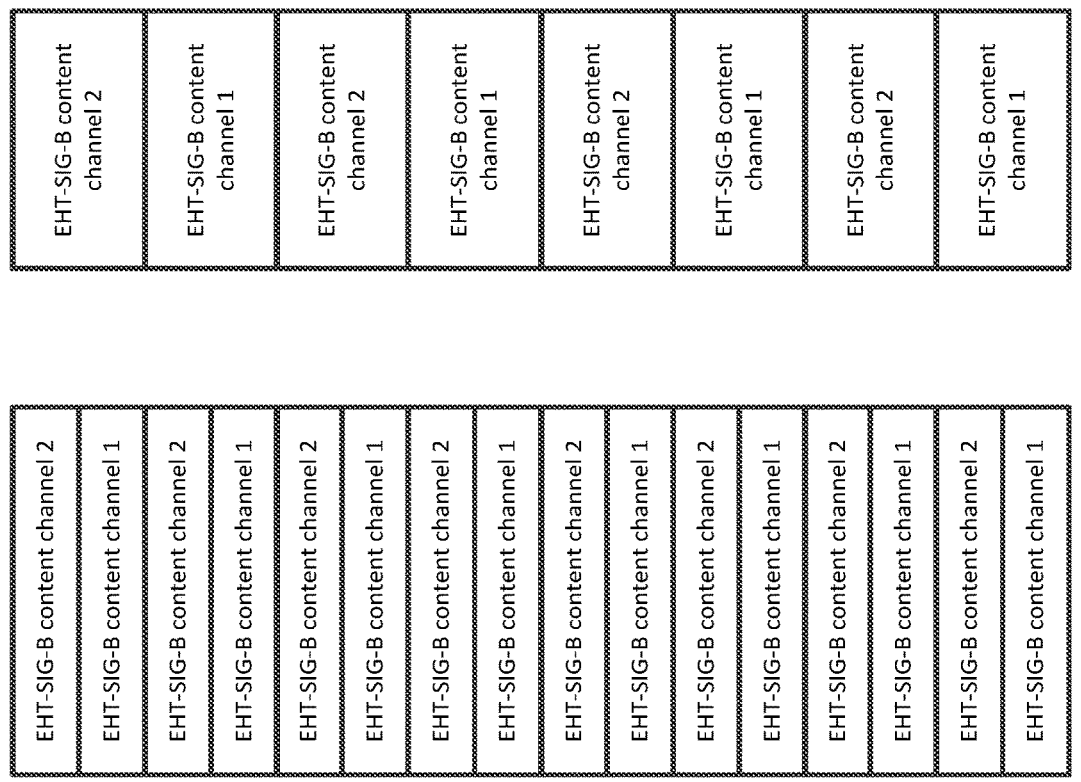

COMMUNICATION APPARATUS AND COMMUNICATION METHOD FOR CONTROL SIGNALING

TECHNICAL FIELD

The present disclosure relates to communication apparatuses and methods for control signaling, and more particularly to communication apparatuses and methods for control signaling in EHT WLAN (extremely high throughput wireless local area network).

BACKGROUND

In the standardization of next generation wireless local area network (WLAN), a new radio access technology having backward compatibilities with IEEE 802.11a/b/g/n/ac/ax technologies has been discussed in the IEEE 802.11 Working Group and is named Extremely High Throughput (EHT) WLAN.

In EHT WLAN, in order to provide significant peak throughput and capacity increase beyond 802.11ax high efficiency (HE) WLAN, it is desired to increase the maximum channel bandwidth from 160 MHz to 320 MHz, increase the maximum number of spatial streams from 8 to 16 and to support multi-band operation. Further, in order to improve spectral efficiency over 11 ax HE WLAN, it has been proposed to allow multiple contiguous or non-contiguous resource units (RUs) assigned to a single communication apparatus.

However, there has been no discussion on communication apparatuses and methods for control signaling, specifically on efficient signaling support for assigning one or more RUs to a single communication apparatus in the context of EHT WLAN.

There is thus a need for communication apparatuses and methods that provide feasible technical solutions for control signaling in the context of EHT WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for control signaling in context of EHT WLAN.

According to an embodiment of the present disclosure, there is provided a communication apparatus comprising circuitry which, in operation, generates a transmission signal comprising a plurality of user fields and a data field, the data field comprising a plurality of resource units (RUs); and a transmitter, which, in operation, transmits the generated transmission signal, wherein a single transmission scheme is applied to one or more RUs of the plurality of RUs, which are assigned to another communication apparatus, and wherein one or more user fields of the plurality of user fields are addressed to the another communication apparatus and a number of the one or more user fields addressed to the another communication apparatus is equal to a number of the one or more RUs assigned to the another communication apparatus, and the one or more user fields addressed to the another communication apparatus correspond to the one or more RUs assigned to the another communication apparatus respectively.

According to another embodiment of the present disclosure, there is provided a communication apparatus comprising a receiver, which, in operation, receives a signal comprising a plurality of user fields and a data field, the data field comprising a plurality of RUs; and circuitry, which, in operation, processes the received signal, wherein a single transmission scheme is applied to one or more RUs of the plurality of RUs, which are assigned to the communication apparatus, and wherein one or more user fields of the plurality of user fields are addressed to the communication apparatus and a number of the one or more user fields addressed to the communication apparatus is equal to a number of the one or more RUs assigned to the communication apparatus, and the one or more user fields addressed to the communication apparatus correspond to the one or more RUs assigned to the communication apparatus respectively.

According to yet another embodiment of the present disclosure, there is provided a communication method comprising generating a transmission signal comprising a plurality of user fields and a data field, the data field comprising a plurality of RUs; and transmitting the generated transmission signal, wherein a single transmission scheme is applied to one or more RUs of the plurality of RUs, which are assigned to another communication apparatus, and wherein one or more user fields of the plurality of user fields are addressed to the another communication apparatus and a number of the one or more user fields addressed to the another communication apparatus is equal to a number of the one or more RUs assigned to the another communication apparatus, and the one or more user fields addressed to the another communication apparatus correspond to the one or more RUs assigned to the another communication apparatus respectively.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 2B shows a table of how the number of EHT-SIG-B (EHT Signal B) content channels depends on the bandwidth and the value of L according to various embodiments.

FIG. 2C shows a diagram of mapping of the one or two EHT-SIG-B content channels in a 40 MHz EHT MU PPDU.

FIG. 2F shows a diagram of mapping of the two EHT-SIG-B content channels in a 160+160 MHz or 320 MHz EHT MU PPDU.

FIG. 10 depicts a flow diagram illustrating processing of a received EHT Trigger frame according to another embodiment.

Figure 1A:
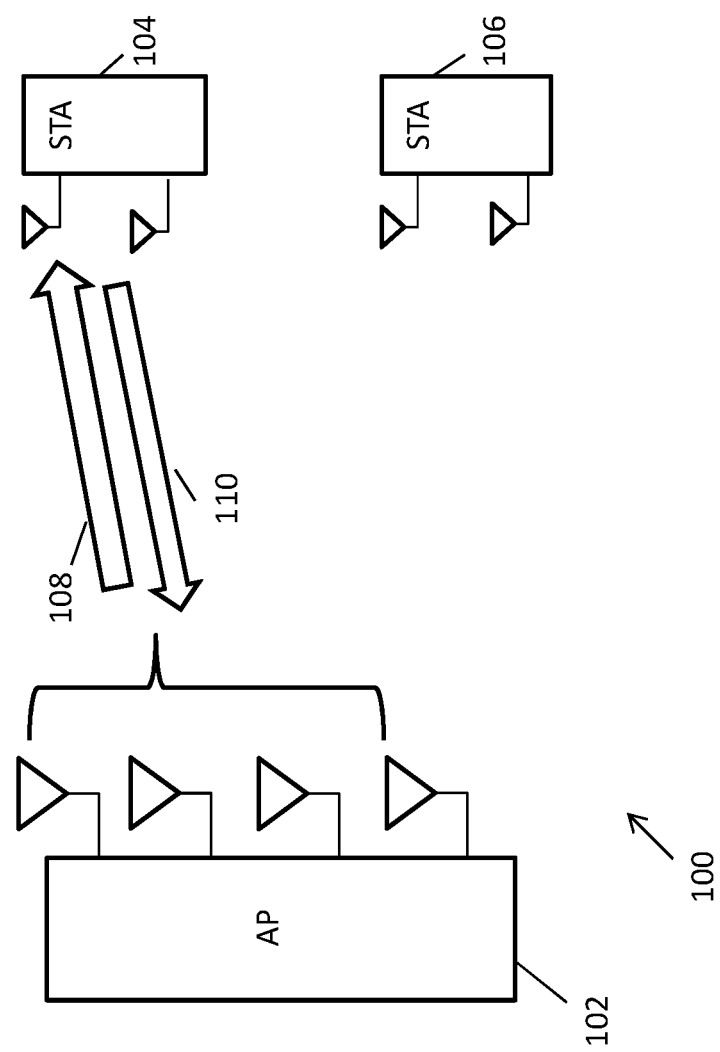
FIG. 1A depicts a schematic diagram of uplink and downlink single-user (SU) multiple input multiple output (MIMO) communications between an access point (AP) and a station (STA) in a MIMO wireless network.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for uplink or downlink control signaling, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

FIG. 1A depicts a schematic diagram of SU-MIMO communications 100 between an AP 102 and a STA 104 in a MIMO wireless network. As shown, the MIMO wireless network may include one or more STAs (e.g. STA 104, STA 106, etc.). In the SU-MIMO communications 100, the AP 102 transmits multiple space-time streams using multiple antennas (e.g. four antennas as shown in FIG. 1A) with all the space-time streams directed to a single communication apparatus, i.e. the STA 104. For the sake of simplicity, the multiple space-time streams directed to the STA 104 are illustrated as a grouped data transmission arrow 108 directed to the STA 104.

The SU-MIMO communications 100 can be configured for bi-directional transmissions. As shown in FIG. 1A, in the SU-MIMO communications 100, the STA 104 may transmit multiple space-time streams using multiple antennas (e.g. two antennas as shown in FIG. 1A) with all the space-time streams directed to the AP 102. For the sake of simplicity, the multiple space-time streams directed to the AP 102 are illustrated as a grouped data transmission arrow 110 directed to the AP 102.

As such, the SU-MIMO communications 100 depicted in FIG. 1A enables both uplink and downlink SU transmissions in a MIMO wireless network.

Figure 1B:
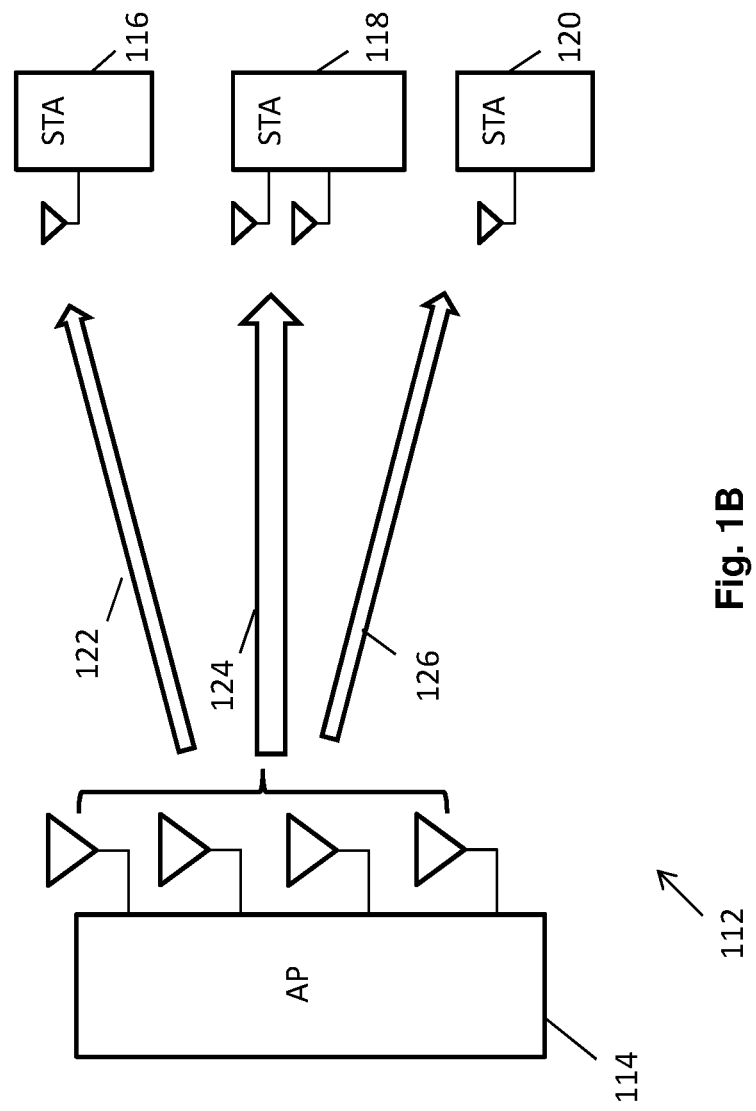
FIG. 1B depicts a schematic diagram of downlink multi-user MIMO (MU-MIMO) communications between an AP and multiple STAs in a MIMO wireless network.
Figure 1C:
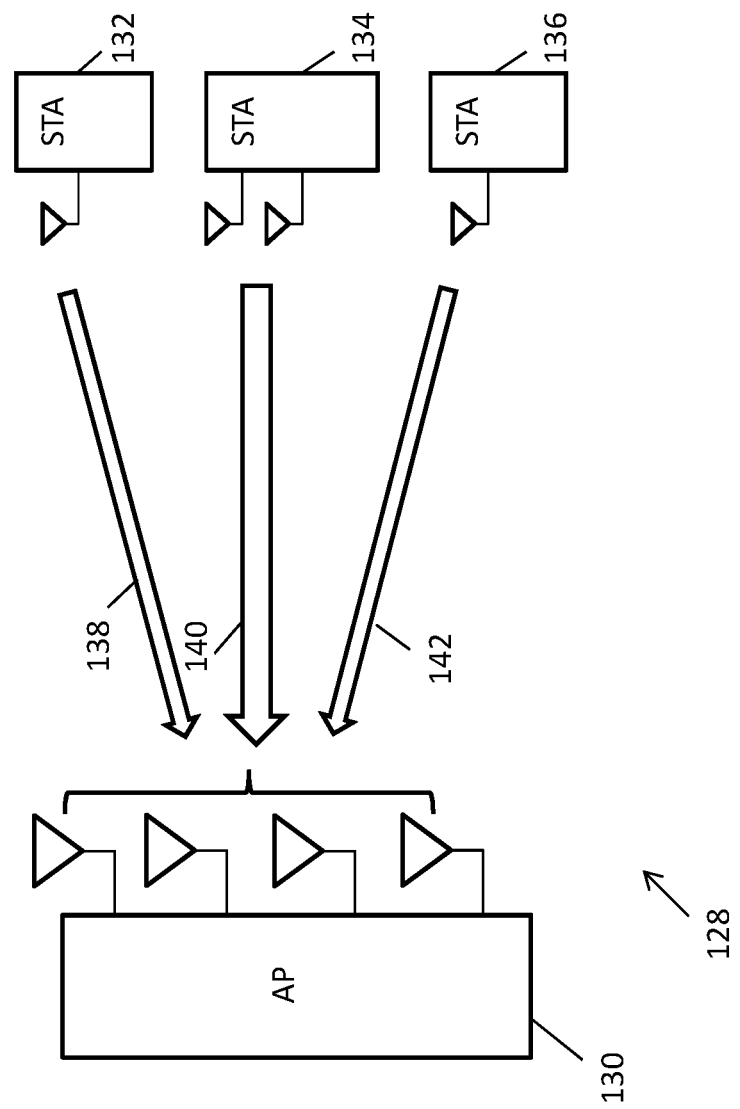

FIG. 1B depicts a schematic diagram of downlink MU-MIMO communications 112 between an AP 114 and multiple STAs 116, 118, 120 in a MIMO wireless network. The MIMO wireless network may include one or more STAs (e.g. STA 116, STA 118, STA 120, etc.). In the downlink MU-MIMO communications 112, the AP 114 transmits multiple streams simultaneously to the STAs 116, 118, 120 in the network using multiple antennas via spatial mapping or precoding techniques. For example, two space-time streams may be directed to the STA 118, another space-time stream may be directed to the STA 116, and yet another space-time stream may be directed to the STA 120. For the sake of simplicity, the two space-time streams directed to the STA 118 are illustrated as a grouped data transmission arrow 124, the space-time stream directed to the STA 116 is illustrated as a data transmission arrow 122, and the space-time stream directed to the STA 120 is illustrated as a data transmission arrow 126.

Figure 10:
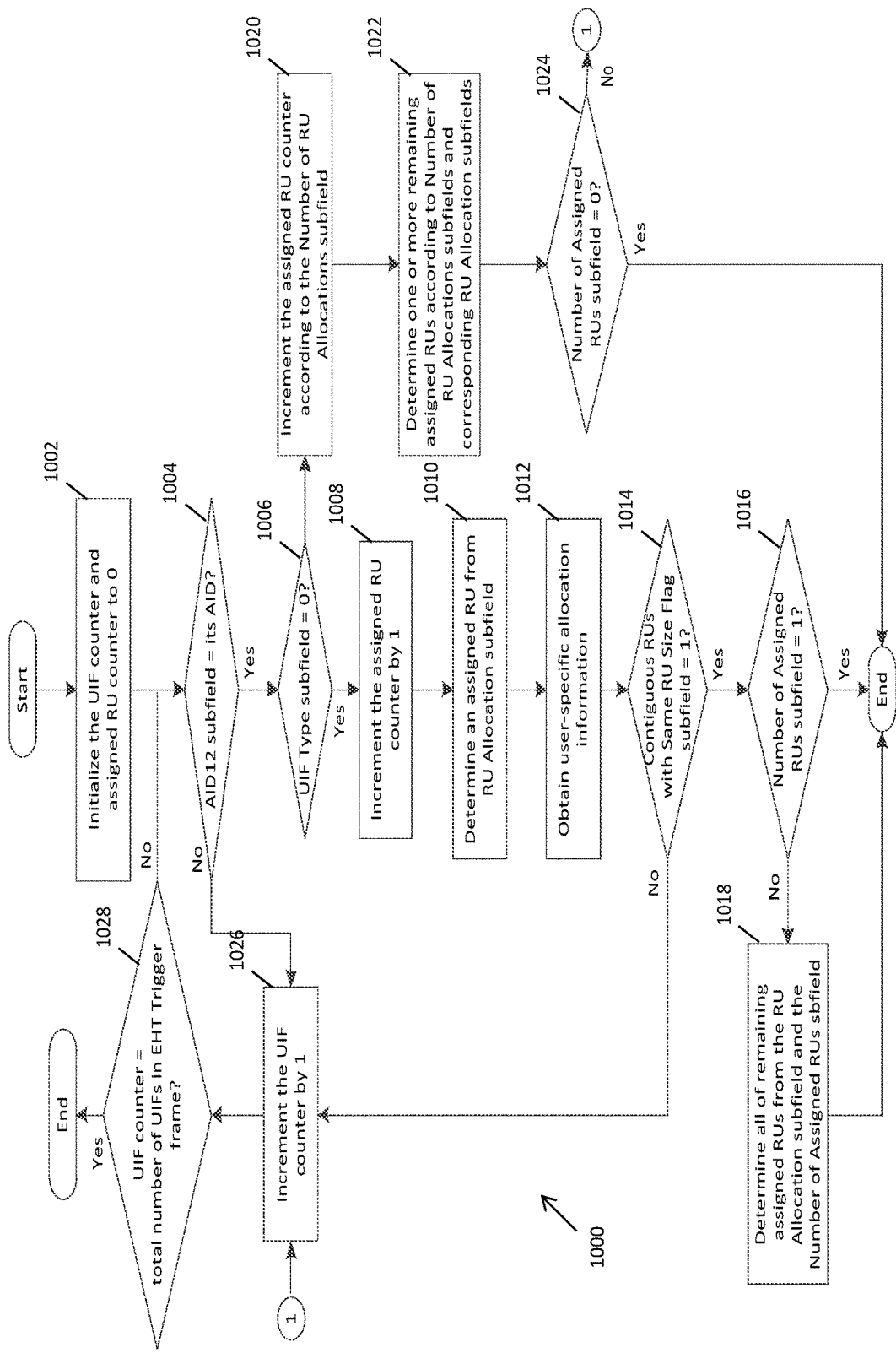
FIG. 10 depicts a schematic diagram of uplink MU-MIMO communications between an AP and multiple STAs in a MIMO wireless network

FIG. 10 depicts a schematic diagram of uplink MU-MIMO communications 128 between an AP 130 and multiple STAs 132, 134, 136 in a MIMO wireless network. The MIMO wireless network may include one or more STAs (e.g. STA 132, STA 134, STA 136, etc.). In the uplink MU-MIMO communications 128, the STAs 132, 134, 136 transmits respective streams simultaneously to the AP 130 in the network using respective antennas via spatial mapping or precoding techniques. For example, two space-time streams may be directed to the AP 130 from STA 134, another space-time stream may be directed to the AP 130 from STA 132, and yet another space-time stream may be directed to the AP 130 from STA 136. For the sake of simplicity, the two space-time streams directed to the AP 130 from STA 134 are illustrated as a grouped data transmission arrow 140, the space-time stream directed to the AP 130 from STA 132 is illustrated as a data transmission arrow 138, and the space-time stream directed to the AP 130 from STA 136 is illustrated as a data transmission arrow 142.

Due to packet/PPDU (physical layer protocol data unit) based transmission and distributed MAC scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

In 11ax HE WLAN, only a single resource unit (RU) is allowed to be assigned to a STA. With the increase in the maximum channel bandwidth from 160 MHz to 320 MHz, the increase in the maximum number of spatial streams from 8 to 16 and the increased support of multi-band operation in EHT WLAN, it is an object of present disclosure to substantially overcome the existing challenges to provide communication apparatuses and methods for control signaling that allow multiple contiguous or non-contiguous RUs to be assigned to a STA in order to improve spectral efficiency of EHT WLAN over 11 ax HE WLAN.

Figure 2A:
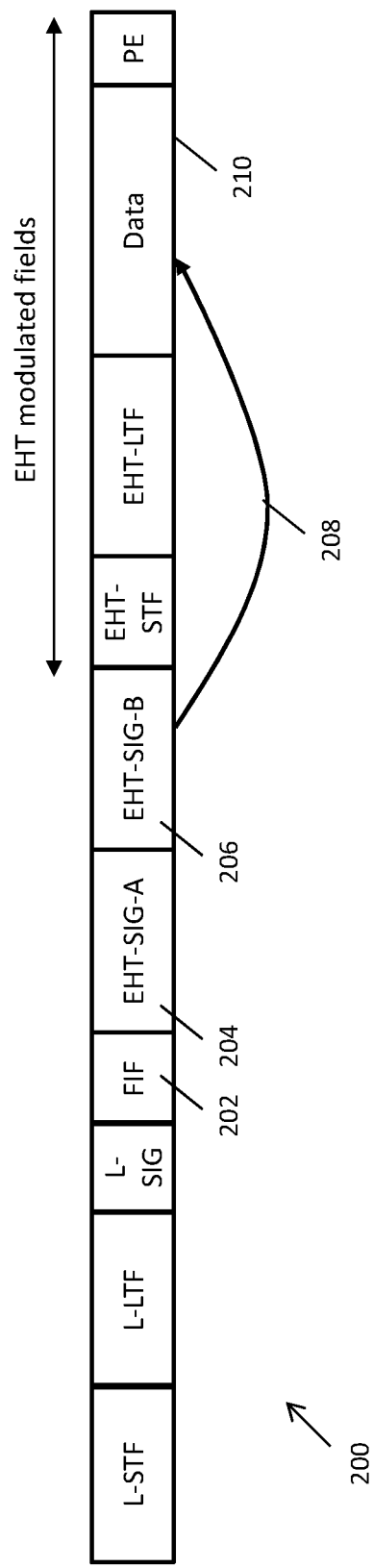
FIG. 2A depicts an example format of EHT MU PPDU (physical layer protocol data unit) used for downlink MU (multi-user) communications between an AP and multiple STAs in an EHT WLAN.

If the MIMO wireless network is with an extremely high throughput, such as an EHT WLAN, a PPDU used for downlink MU transmission, e.g. downlink OFDMA (Orthogonal Frequency Division Multiple Access) transmission including MU-MIMO transmission in a single RU (resource unit) and downlink full-bandwidth MU-MIMO transmission, may be referred to as EHT MU PPDU 200 like illustrated in FIG. 2A; a PPDU used for uplink MU transmission, e.g. uplink OFDMA transmission including MU-MIMO transmission in a single RU and uplink full-bandwidth MU-MIMO transmission, may be referred to as EHT TB PPDU like illustrated in FIG. 2B.

FIG. 2A depicts an example format of an EHT MU PPDU 200. It is appreciable that if the IEEE 802.11 Working Group may use a new name instead of "EHT WLAN" for the next generation WLAN with an extremely high throughput, the prefix "EHT" in the above fields may change accordingly. The EHT MU PPDU 200 may include a non-High Throughput Short Training Field (L-STF), a non-High Throughput Long Training Field (L-LTF), a non-High Throughput SIGNAL (L-SIG) field, a Format Identification field (FIF) 202, an EHT SIGNAL A (EHT-SIG-A) field 204, an EHT SIGNAL B (EHT-SIG-B) field 206, an EHT Short Training Field (EHT-STF), an EHT Long Training Field (EHT-LTF), a Data field 170 and a Packet Extension (PE) field. The FIF 202 is mainly used for identifying the format of an EHT PPDU. The EHT-SIG-A field 204 contains the necessary information for decoding the EHT-SIG-B field 206, e.g. modulation and coding scheme (MCS) for EHT-SIG-B, number of EHT-SIG-B symbols, like indicated by an arrow 204. The EHT-SIG-B field 206 provides the OFDMA and MU-MIMO resource allocation information to allow STAs to look up the corresponding resources to be used in the Data field 210, like indicated by an arrow 208. The EHT-STF, the EHT-LTF, the Data field and the PE field may be grouped as EHT modulated fields. The EHT-SIG-B field 206 includes (or consists of) a Common field, if present, followed by a User Specific field which together are referred to as the EHT-SIG-B content channel.

According to various embodiments, the EHT-SIG-B field 206 of the EHT MU PPDU 200 is separately encoded on each L×20 MHz subchannel, where L=1 or 2. In instances where the bandwidth is more than 20 MHz, compared with the EHT-SIG-B field with L=2, the EHT-SIG-B field with L=1 may have better EHT-SIG-B decoding performance. This is because channel estimation used for decoding the EHT-SIG-B field is based on the L-LTF, which is transmitted with 20 MHz bandwidth. Channel estimation with interpolation is necessary for decoding the EHT-SIG-B field with L=2, which may degrade performance of decoding the EHT-SIG-B field with L=2. On the other hand, compared with the EHT-SIG-B field with L=1, the EHT-SIG-B field with L=2 may have less EHT-SIG-B overhead, especially for larger bandwidth. In addition, if the intended STAs of the EHT MU PPDU 200 include at least one 20 MHz operating STA, the EHT-SIG-B field with L=2 shall not be used, since the EHT-SIG-B field with L=2 cannot be decoded by 20 MHz operating STAs. As a result, it is advantageous that the AP may determine the value of L at its discretion and a signalling may be included in the EHT-SIG-A field of the EHT MU PPDU 200 to indicate if L takes on the value of 1 or 2.

FIG. 2B shows a table of how the number of EHT-SIG-B content channels depends on the bandwidth and the value of L according to various embodiments. As shown in FIG. 2B, in the event that the bandwidth is 20 MHz, L can only be 1 because the EHT-SIG-B field is encoded on a per-20 MHz basis and there will be only one EHT-SIG-B content channel. In the embodiment where the bandwidth is 40 MHz, L may be assigned by the AP the value of 1 or 2. If L is set to "1", there will be two EHT-SIG-B content channels. If L is set to "2", there will be only one EHT-SIG-B content channel. In the embodiment where the bandwidth is 80 MHz, 80+80 MHz, 160 MHz, 160+160 MHz or 320 MHz, there will be two EHT-SIG-B content channels regardless of the value of L. More details will be provided below.

FIG. 2C shows a diagram of mapping of the one or two EHT-SIG-B content channels in a 40 MHz EHT MU PPDU. The number of EHT-SIG-B content channels depends on the bandwidth and the value of L as shown in FIG. 2B. A 40 MHz channel comprises two 20 MHz subchannels. When L=1, there will be two EHT-SIG-B content channels (namely, EHT-SIG-B content channel 1 and EHT-SIG-B content channel 2) which are transmitted in the $1^{st}$ and $2^{nd}$ 20 MHz subchannels, respectively. When L=2, there will be only one EHT-SIG-B content channel.

Figure 2D:
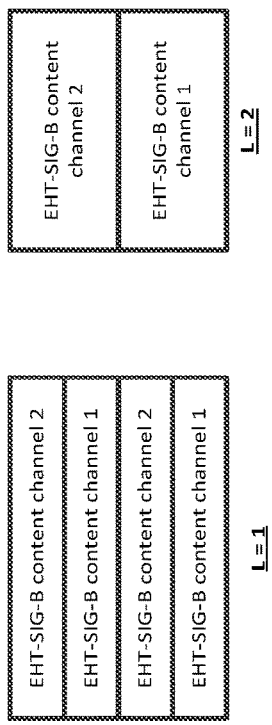
FIG. 2D shows a diagram of mapping of the two EHT-SIG-B content channels in an 80 MHz EHT MU PPDU.

FIG. 2D shows a diagram of mapping of the two EHT-SIG-B content channels (namely EHT-SIG-B content channel 1 and EHT-SIG-B content channel 2) in an 80 MHz EHT MU PPDU. When L=1, in an 80 MHz channel comprising four 20 MHz subchannels, EHT-SIG-B content channel 1 is duplicated and transmitted in the $1^{st}$ and $3^{rd}$ 20 MHz subchannels while EHT-SIG-B content channel 2 is duplicated and transmitted in the $2^{nd}$ and $4^{th}$ 20 MHz subchannels. When L=2, in an 80 MHz channel comprising two 40 MHz subchannels, EHT-SIG-B content channel 1 is transmitted in the $1^{st}$ 40 MHz subchannel while EHT-SIG-B content channel 2 is transmitted in the $2^{nd}$ 40 MHz subchannel.

Figure 2E:
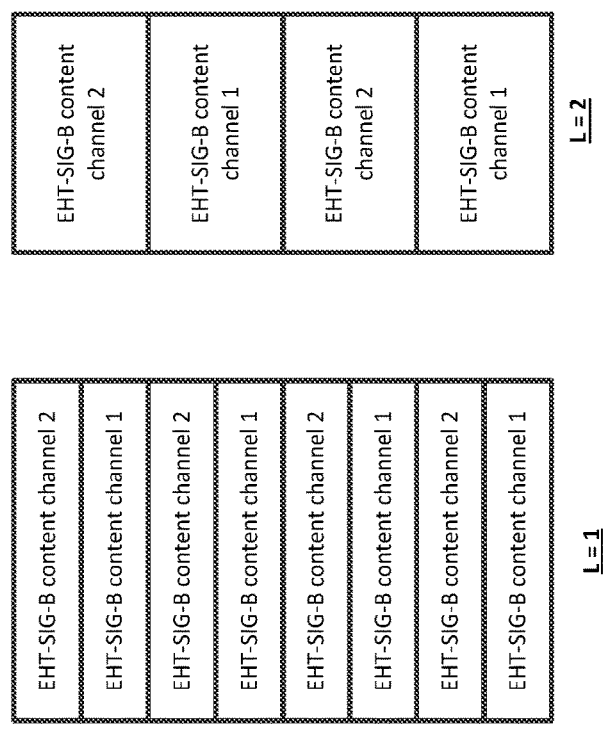
FIG. 2E shows a diagram of mapping of the two EHT-SIG-B content channels in an 80+80 MHz or 160 MHz EHT MU PPDU.

FIG. 2E shows a diagram of mapping of the two EHT-SIG-B content channels in an 80+80 MHz or 160 MHz EHT MU PPDU. When L=1, in an 80+80 MHz or 160 MHz channel comprising eight 20 MHz subchannels, EHT-SIG-B content channel 1 is duplicated and transmitted in the $1^{st}$, $3^{rd}$, $5^{th}$ and $7^{th}$ 20 MHz subchannels while EHT-SIG-B content channel 2 is duplicated and transmitted in the $2^{nd}$, $4^{th}$, $6^{th}$ and $8^{th}$ 20 MHz subchannels. When L=2, in an 80+80 MHz or 160 MHz channel comprising four 40 MHz subchannels, EHT-SIG-B content channel 1 is duplicated and transmitted in the $1^{st}$ and $3^{rd}$ 40 MHz subchannels while EHT-SIG-B content channel 2 is duplicated and transmitted in the $2^{nd}$ and $4^{th}$ 40 MHz subchannels.

FIG. 2F shows a diagram of mapping of the two EHT-SIG-B content channels in a 160+160 MHz or 320 MHz EHT MU PPDU. When L=1, in a 160+160 MHz or 320 MHz channel comprising sixteen 20 MHz subchannels, EHT-SIG-B content channel 1 is duplicated and transmitted in the $1^{st}$, $3^{rd}$, $5^{th}$, $7^{th}$, $9^{th}$, $11^{th}$, $13^{th}$ and $15^{th}$ 20 MHz subchannels while EHT-SIG-B content channel 2 is duplicated and transmitted in the $2^{nd}$, $4^{th}$, $6^{th}$, $8^{th}$, $10^{th}$, $12^{th}$, $14^{th}$ and $16^{th}$ 20 MHz subchannels. When L=2, in a 160+160 MHz or 320 MHz channel comprising eight 40 MHz subchannels, EHT-SIG-B content channel 1 is duplicated and transmitted in the $1^{st}$, $3^{rd}$, $5^{th}$ and $7^{th}$ 40 MHz subchannels while EHT-SIG-B content channel 2 is duplicated and transmitted in the $2^{nd}$, $4^{th}$, $6^{th}$ and $8^{th}$ 40 MHz subchannels.

Figure 2G:
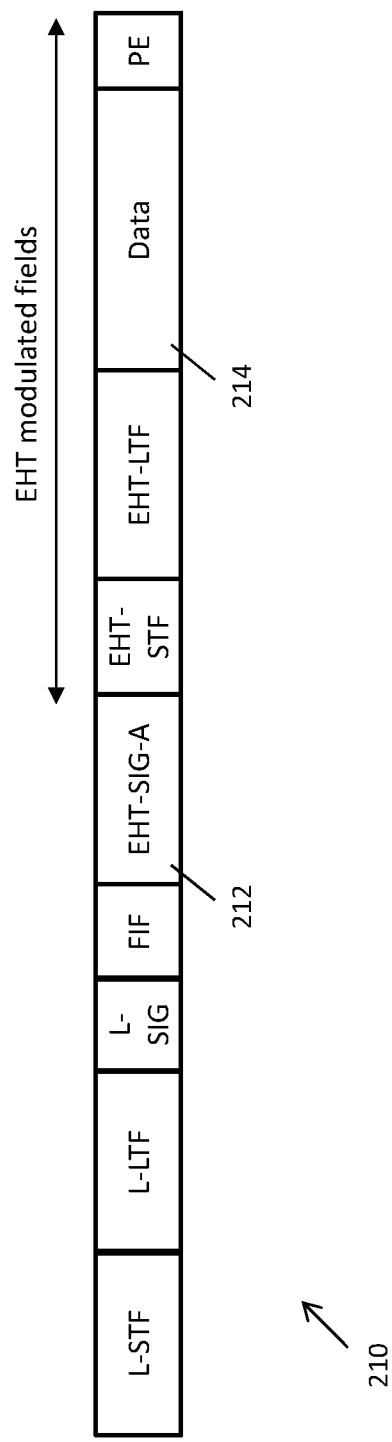
FIG. 2G depicts an example format of EHT TB (trigger based) PPDU used for uplink MU communications between an AP and multiple STAs in an EHT WLAN.

FIG. 2G depicts an example format of an EHT TB PPDU 210. The EHT TB PPDU 210 has a similar structure to EHT MU PPDU 200 but without EHT-SIG-B field 206. An EHT TB PPDU 210 may include a L-STF, a L-LTF, a L-SIG field, a FIF, an EHT-SIG-A field 212, an EHT-STF, an EHT-LTF, a Data field 214 and a PE field. The EHT-STF, the EHT-LTF, the Data field 214 and the PE field may be grouped as EHT modulated fields. An EHT TB PPDU 210 is used in an EHT WLAN for uplink MU transmission that is in response to a frame carrying trigger information. The frame carrying trigger information may be an EHT Trigger frame. The information required for the uplink MU transmission from one or more STAs is carried by the frame that solicits this transmission. In a typical transmission of the EHT TB PPDU 210, EHT-SIG-A related information is copied from the previous frame carrying trigger information into the EHT-SIG-A field 212 of the EHT TB PPDU 210.

Due to the maximum number of spatial streams of 16, the maximum CBW of 320 MHz and multi-band operation in an EHT WLAN, the number of allocations and/or the number of users supported in an EHT TB PPDU may be significantly increased. As a result, a frame for soliciting an EHT TB PPDU transmission may have much larger signaling overhead than that for soliciting a HE TB PPDU transmission. The devices and methods according to various embodiments may advantageously reduce the signaling overhead, especially when the bandwidth is more than 20 MHz.

According to various embodiments, EHT WLAN supports control signaling that allows multiple contiguous or non-continuous resource units (RUs) assigned to a single communication apparatus.

Figure 3A:
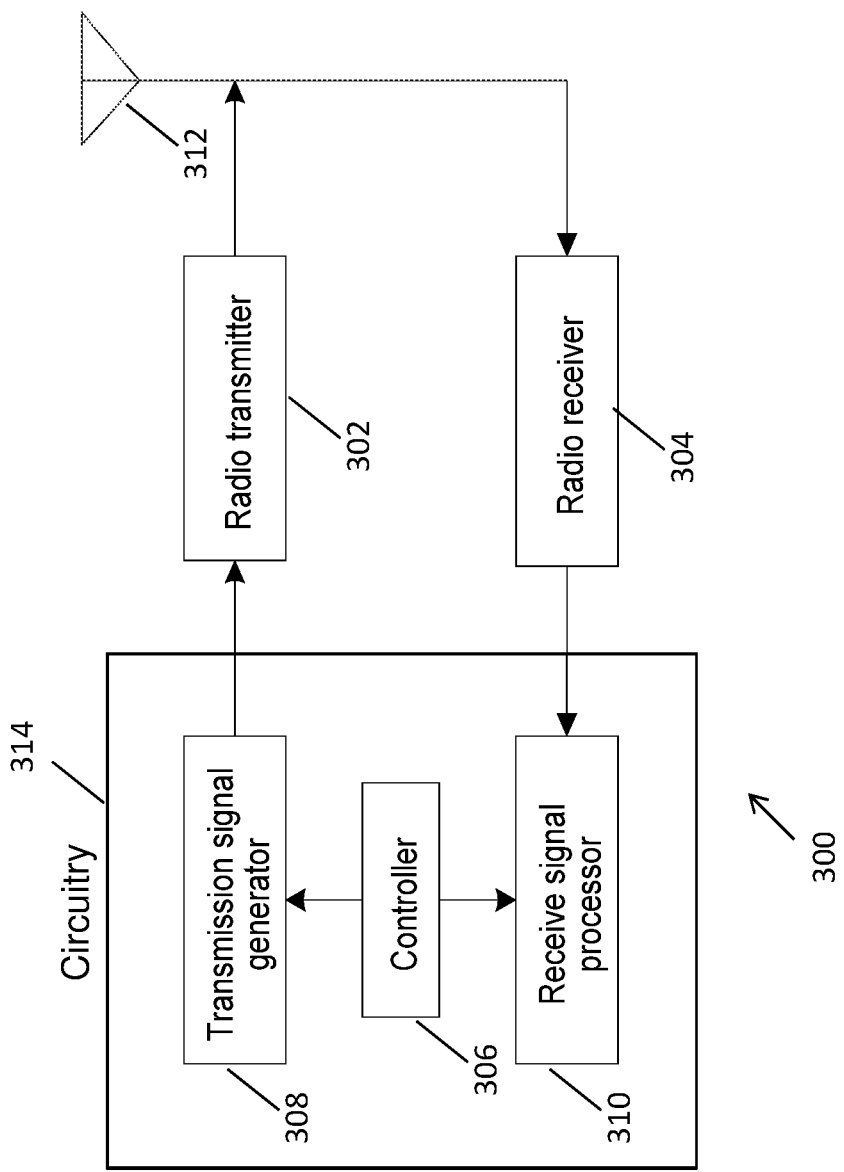
FIG. 3A shows a schematic example of communication apparatus in accordance with various embodiments. The communication apparatus may be implemented as an AP or an STA and configured for control signaling in accordance with various embodiments of the present disclosure.

FIG. 3A shows a schematic, partially sectioned view of a communication apparatus 300 according to various embodiments. The communication apparatus 300 may be implemented as an AP or an STA according to various embodiments.

As shown in FIG. 3A, the communication apparatus 300 may include circuitry 314, at least one radio transmitter 302, at least one radio receiver 304, and at least one antenna 312 (for the sake of simplicity, only one antenna is depicted in FIG. 3A for illustration purposes). The circuitry 314 may include at least one controller 306 for use in software and hardware aided execution of tasks that the at least one controller 306 is designed to perform, including control of communications with one or more other communication apparatuses in a MIMO wireless network. The circuitry 314 may furthermore include at least one transmission signal generator 308 and at least one receive signal processor 310. The at least one controller 306 may control the at least one transmission signal generator 308 for generating PPDUs (for example EHT MU PPDUs or PPDUs containing EHT Trigger frames if the communication apparatus 300 is an AP, and for example EHT TB PPDUs if the communication apparatus 300 is a STA) to be sent through the at least one radio transmitter 302 to one or more other communication apparatuses and the at least one receive signal processor 310 for processing PPDUs (for example EHT TB PPDUs if the communication apparatus 300 is an AP, and for example EHT MU PPDUs or PPDUs containing EHT Trigger frames if the communication apparatus 300 is a STA) received through the at least one radio receiver 304 from the one or more other communication apparatuses under the control of the at least one controller 306. The at least one transmission signal generator 308 and the at least one receive signal processor 310 may be stand-alone modules of the communication apparatus 300 that communicate with the at least one controller 306 for the above-mentioned functions, as shown in FIG. 3A. Alternatively, the at least one transmission signal generator 308 and the at least one receive signal processor 310 may be included in the at least one controller 306. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 302, at least one radio receiver 304, and at least one antenna 312 may be controlled by the at least one controller 306.

The communication apparatus 300, when in operation, provides functions required for control signaling in downlink MU communications. For example, the communication apparatus 300 may be an AP, and the circuitry 314 (for example the at least one transmission signal generator 308 of the circuitry 314) may, in operation, generate a transmission signal (for example an EHT MU PPDU) comprising a plurality of user fields (for example User fields of User Specific field in EHT-SIG-B field of an EHT MU PPDU) and a data field (for example in an EHT MU PPDU), the data field comprising a plurality of RUs. The radio transmitter 302 may in operation, transmit the generated transmission signal, wherein a single transmission scheme is applied to one or more RUs of the plurality of RUs, which are assigned to another communication apparatus (for example a STA), and wherein one or more user fields of the plurality of user fields are addressed to the other communication apparatus, and a number of the one or more user fields are addressed to the other communication apparatus is equal to a number of the one or more RUs assigned to the other communication apparatus, and the one or more user fields addressed to the other communication apparatus correspond to the one or more RUs assigned to the other communication apparatus respectively. This may allow multiple contiguous or non-contiguous RUs assigned to the other communication apparatus and may advantageously enable efficient signaling support and improve spectral efficiency of EHT WLAN over 11 ax HE WLAN.

The communication apparatus 300 may be an STA, and the radio receiver 304 may, in operation, receive a transmission signal (for example an EHT MU PPDU) from another communication apparatus (for example an AP) comprising a plurality of user fields (for example User fields of User Specific field in EHT-SIG-B field of an EHT MU PPDU) and a data field (for example in an EHT MU PPDU), the data field comprising a plurality of RUs. The circuitry 314 (for example the at least one receive signal processor 310 of the circuitry 314) may process the received transmission signal, wherein a single transmission scheme is applied to one or more RUs of the plurality of RUs, which are assigned to the communication apparatus (STA), and wherein one or more user fields of the plurality of user fields are addressed to the communication apparatus, and a number of the one or more user fields are addressed to the communication apparatus is equal to a number of the one or more RUs assigned to the communication apparatus, and the one or more user fields addressed to the communication apparatus correspond to the one or more RUs assigned to the communication apparatus respectively.

The communication apparatus 300, when in operation, provides functions required for control signaling in uplink MU communications. For example, the communication apparatus 300 may be an STA, and the radio receiver 304 may, in operation, receive a signal (for example an EHT Trigger frame) from another communication apparatus (for example an AP) comprising a plurality of user info fields (for example User Info fields of User Info List field in EHT Trigger frame). The circuitry 314 (for example the at least one transmission signal generator 308 of the circuitry 314) may, in operation, generate a transmission signal (for example an EHT TB PPDU) comprising a data field (for example in an EHT TB PPDU), the data field comprising a plurality of RUs. The radio transmitter 302 may in operation, transmit the generated transmission signal to the another transmission apparatus, wherein a single transmission scheme is applied to one or more RUs of the plurality of RUs, which are assigned to the communication apparatus, and wherein one or more user info fields of the plurality of user info fields in the signal received from the another transmission apparatus are addressed to the communication apparatus, and a number of the one or more user info fields are addressed to the communication apparatus may be smaller than a number of the one or more RUs assigned to the communication apparatus.

For example, the communication apparatus 300 may be an AP, and the circuitry 314 (for example the at least one transmission signal generator 308 of the circuitry 314) may, in operation, generate a transmission signal (for example an EHT Trigger frame) comprising a plurality of user info fields (for example User Info fields of User Info List field in EHT Trigger frame). The radio transmitter 302 may in operation, transmit the generated transmission signal to another transmission apparatus. The radio receiver 304 may, in operation, receive a signal (for example an EHT TB PPDU) from the another communication apparatus (for example a STA) comprising a data field (for example in an EHT TB PPDU), the data field comprising a plurality of RUs, wherein a single transmission scheme is applied to one or more RUs of the plurality of RUs, which are assigned to the another communication apparatus, and wherein one or more user info fields of the plurality of user info fields in the transmission signal are addressed to the another communication apparatus, and a number of the one or more user info fields are addressed to the another communication apparatus may be smaller than a number of the one or more RUs assigned to the another communication apparatus.

Figure 3B:
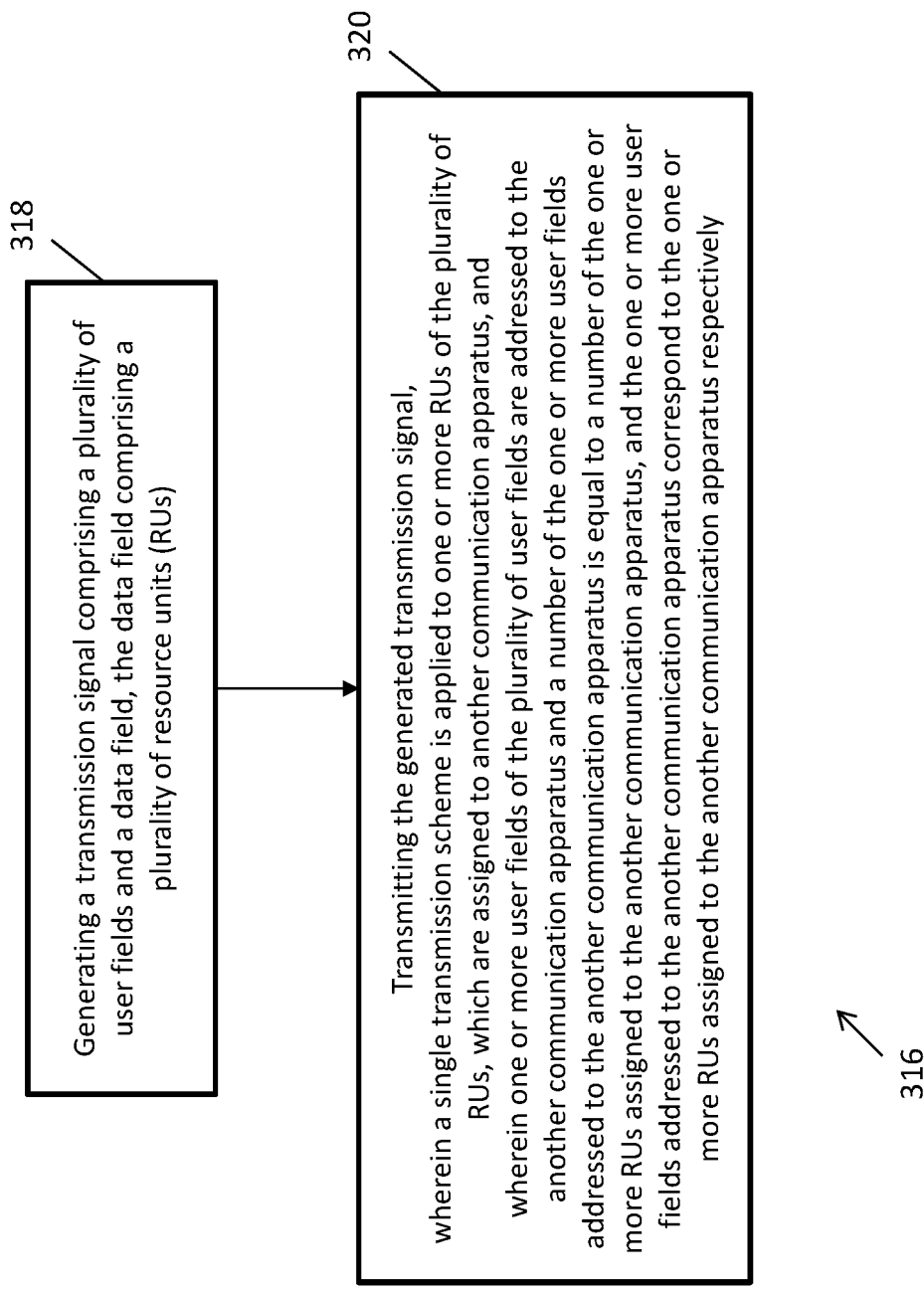
FIG. 3B shows a flow diagram illustrating a communication method according to various embodiments.

FIG. 3B shows a flow diagram 316 illustrating a communication method for control signaling according to various embodiments. In step 318, a transmission signal comprising a plurality of user fields and a data field, the data field comprising a plurality of RUs, is generated. In step 320, the generated transmission signal is transmitted to another communication apparatus, wherein a single transmission scheme is applied to one or more RUs of the plurality of RUs, which are assigned to the another communication apparatus, and wherein one or more user fields of the plurality of user fields are addressed to the another communication apparatus, and a number of the one or more user fields are addressed to the another communication apparatus is equal to a number of the one or more RUs assigned to the another communication apparatus, and the one or more user fields addressed to the another communication apparatus correspond to the one or more RUs assigned to the another communication apparatus respectively.

In the following paragraphs, certain exemplifying embodiments are explained with reference to an AP and multiple STAs for control signaling in downlink MU communications.

Figure 4A:
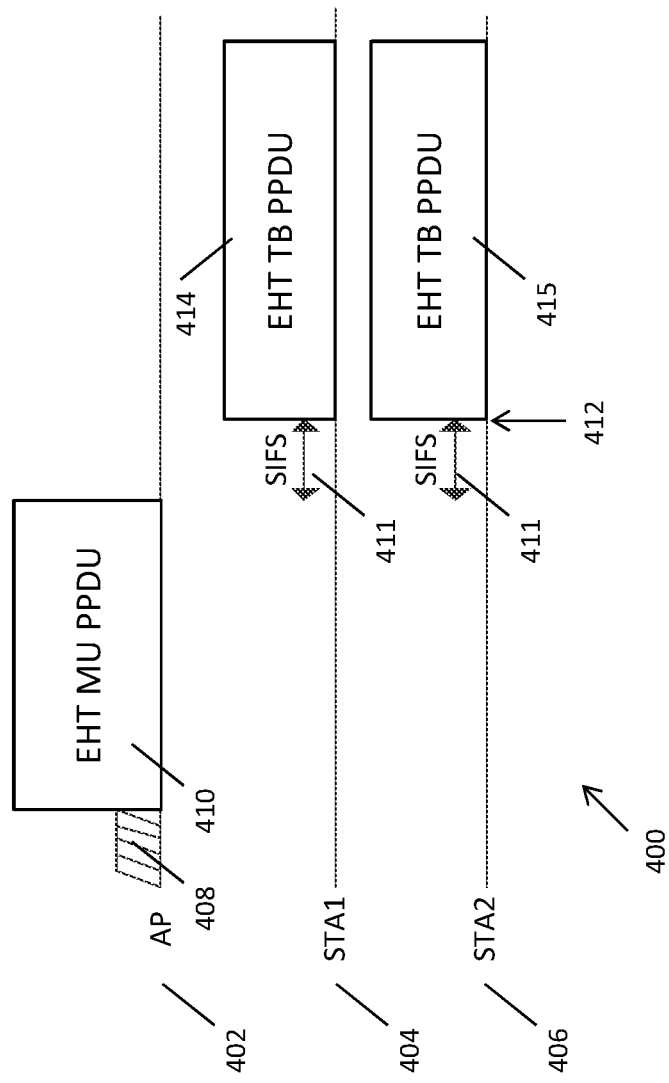
FIG. 4A depicts a flow chart illustrating a downlink MU communication between an AP and multiple STAs using an EHT MU PPDU according to various embodiments.

FIG. 4A depicts a flow chart 400 illustrating a downlink MU communication between an AP 402 and multiple STAs 404, 406 using an EHT MU PPDU 410 according to various embodiments. Contention based channel access procedures, e.g. Enhanced Distributed Channel Access (EDCA) procedures, are illustrated by blocks 408, and Short Interframe Spacings (SIFS) 411 are illustrated. The AP 402 may generate a transmission signal (for example an EHT MU PPDU)

410 comprising a plurality of user fields and a data field, the data field comprising a plurality of RUs. One or more user fields of the plurality of user fields are addressed to STA 404, and a single transmission scheme is applied to one or more RUs assigned to STA 404 for transmission of an A-MPDU (aggregate MAC protocol data unit) to STA 404, which may contain trigger information for soliciting following EHT TB PPDU transmission from STA 404. Similarly, one or more user fields of the plurality of user fields are addressed to STA 406, and a single transmission scheme is applied to one or more RUs assigned to STA 406 for transmission of another A-MPDU to STA 406, which may contain trigger information for soliciting following EHT TB PPDU transmission from STA 406. According to the present disclosure, a number of the one or more user fields addressed to each STA 404, 406 is equal to a number of the one or more RUs assigned to the STA 404, 406, and the one or more user fields addressed to each STA 404, 406 corresponds to the one or more RUs assigned to the STA 404, 406, respectively. In another embodiment, the one or more user fields addressed to each STA 404, 406 contain same user-specific allocation information. In another embodiment, each of the plurality of user fields is either a type 1 user field or a type 2 user field and contains a signaling for indicating its type; and the one or more user fields addressed each STA 404, 406 comprises at least one type 1 user field. According to an embodiment, the type 1 user field contains user-specific allocation information while the type 2 user field does not contain user-specific allocation information. In an embodiment, each of the at least one type 1 user field contains a signaling for indicating whether a single RU is assigned to each STA 404, 406. In another embodiment, if the number of the one or more RUs assigned to each STA 404, 406 is more than one, the one or more user fields addressed to each STA 404, 406 comprises at least one type 2 user field, and each of the at least one type 2 user field contains a signaling for indicating whether the one or more RUs assigned to each STA 404, 406 are contiguous. The radio transmitter of AP 402 may transmit the generated transmission signal 410 to STAs 404, 406.

In IEEE 802.11 networks, a SIFS is the time spacing prior to transmission of an acknowledgement by a STA. The radio receivers of STAs 404, 406 may receive their respective A-MPDUs in the transmission signal 410, based on the user-specific allocation information contained in the one or more user fields addressed to the STAs 404, 406 and the one or more RUs assigned to the STAs 404, 406, and the circuitries of STAs 404, 406 may process the received A-MPDUs, respectively. After the last symbol of the transmission signal 410 is transmitted, a SIFS 411 may take effect, and at 413, the radio transmitters of STAs 404, 406 may simultaneously transmit their respective EHT TB PPDUs 414, 415 to acknowledge successful reception of their respective A-MPDUs, based on the trigger information contained in the EHT MU PPDU 410.

Figure 4B:
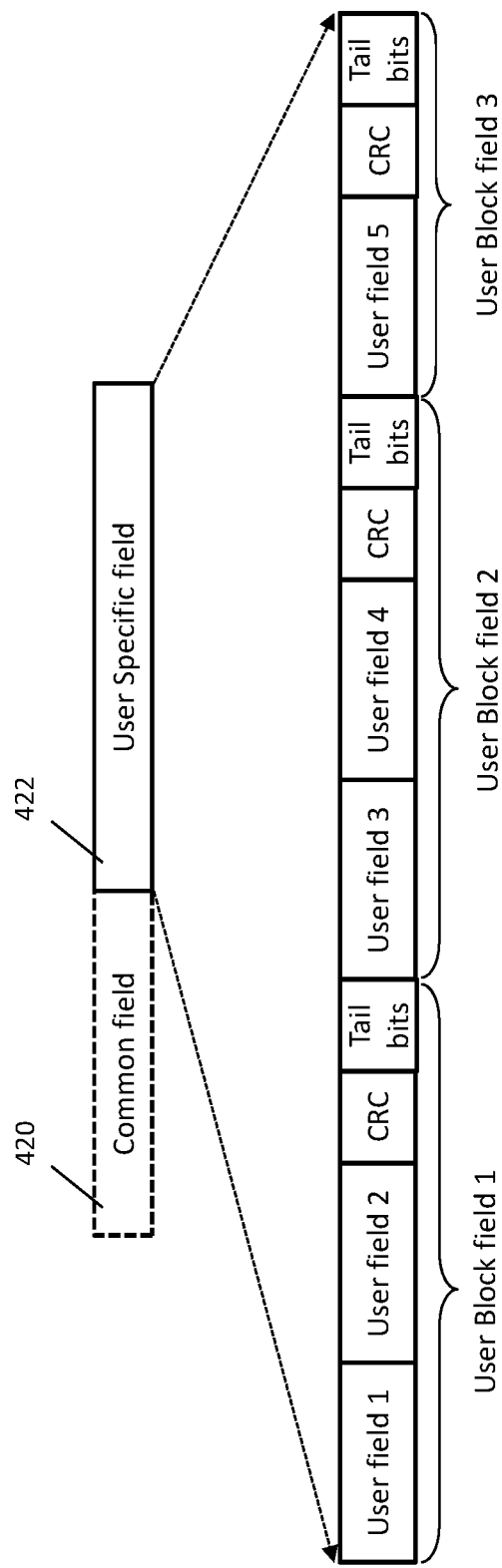
FIG. 4B depicts the EHT-SIG-B field of the EHT MU PPDU in more detail.

FIG. 4B depicts the EHT-SIG-B field 206 of the EHT MU PPDU 200 in more detail. The EHT-SIG-B field 206 includes (or consists of) a Common field 420, if present, followed by a User Specific field 422 which together are referred to as an EHT-SIG-B content channel. The Common field 420 contains information regarding RU allocation such as RU assignment to be used in the EHT modulated fields, RU allocated for MU-MIMO and a number of users in MU-MIMO allocations. The User Specific field 422 consists of one or more User block field(s), each User Block field comprises one or two User fields for non-MU-MIMO allocation(s) and/or MU-MIMO allocation(s). For example, a User Specific field 422 may contain 3 User Block field 1-3 as illustrated in FIG. 4B, the User Block field 1 comprising two user fields like User field 1 and User field 2, User Block field 2 comprising two user fields like User field 3 and User field 4, and User Block field 3 comprising one User field 5, where the one or two user fields in each User Block fields 1 to 3 is appended with cyclic redundancy check (CRC) for detecting error and tail bits for filling up the User Block field to a User Block field size. In an embodiment, the last User Block may consist of one or two user fields depending on the total number of user fields that are allowed in the User Specific field 422 referring to an odd or even number.

According to the present disclosure, a user field, like User field 1, 2, 3, 4 and 5, contains user information indicating a user-specific allocation, i.e. user-specific allocation information. For non-MU-MIMO allocation, user-specific allocation information comprises information on number of spatial streams (NSTS), transmit beamforming (Tx BF), modulation and coding scheme (MCS), dual carrier modulation (DCM), and coding like error control coding. For MU-MIMO allocation, user-specific allocation information comprises information on spatial configuration, MCS and coding like error control coding. According to an embodiment, more information on subfields STA Identifier (ID), NSTS, Tx BF, DCM, MCS, Coding and Spatial configuration in user field for non-MU-MIMO allocation and MU-MIMO allocation can be found in Tables 1 and 2, respectively.

Table 1 indicates user field format for a non-MU-MIMO allocation, wherein BCC is Binary Convolutional Code, and LDPC is Low Density Parity Code.

| Subfield | Number of bits | Description |
|---|---|---|
| STA-ID | 11 | |
| NSTS | 4 | Indicates number of spatial streams. |
| Tx BF | 1 | Indicates whether transmit beamforming is used. |
| DCM | 1 | Indicates whether DCM is used. |
| MCS | 4 | Indicates modulation and coding scheme. Set to n for MCSn, where n = 0, 1, 2 . . . , 11 Values 12 to 15 are reserved |
| Coding | 1 | Indicates whether BCC or LDPC is used. |

Table 2 indicates user field format for an MU-MIMO allocation, wherein BCC is Binary Convolutional Code, and LDPC is Low Density Parity Code.

| Subfield | Number of bits | Description |
|---|---|---|
| STA-ID | 11 | |
| Spatial configuration | 6 | Indicates the number of spatial stream and starting stream index |
| MCS | 4 | Indicates modulation and coding scheme. Set to n for MCSn, where n = 0, 1, 2 . . . , 11 Values 12 to 15 are reserved |
| Coding | 1 | Indicates whether BCC or LDPC is used. |

Conventionally, a user field comprises a total number of 21 bits according with the above formats. In order to support up to 16 spatial streams in an EHT WLAN, the numbers of bits of NSTS subfield may increase from 3 bits to 4 bits for non-MU-MIMO allocation; while the number of bits of Spatial Configuration subfield may increase from 4 bits to 6 bits. The user field according to the present disclosure may contain a total number of 22 bits for both non-MU-MIMO and MU-MIMO allocations, or in other words, one additional bit as compared to that of conventional user field.

According to the present disclosure, one or more RUs may be assigned to a STA in an EHT MU PPDU. A single transmission scheme is applied to the one or more RUs assigned to a STA in an EHT MU PPDU wherein the transmission scheme is characterized by several parameters such as MCS and coding included in the user-specific allocation information. The number of user fields addressed to a STA is the same as the number of RUs assigned to the STA. As such, a user field addressed to a STA uniquely corresponds to a RU assigned to the STA. In particular, this can be achieved through determining if a STA's ID matches the value of the STA ID subfield of a user field, and in response to STA's ID matches the value of the STA ID subfield, determining an assigned RU corresponding to the user field based on the RU allocation information in the Common field and the position of the user field in the User Specific field in the same EHT-SIG-B channel. According to an embodiment of the present disclosure, one or more user fields corresponding to one or more RUs assigned to a STA shall contain the same user-specific allocation information, i.e., the one or more User fields corresponding to the one or more RUs assigned to a STA shall have same subfield values for the user-specific allocation information because a single transmission scheme is applied to the one or more RUs. In an embodiment, two or more contiguous RUs with the same RU size shall not be assigned to a STA if the two or more contiguous RUs are exactly fit into a single RU with a larger RU size. For example, two contiguous 26-tone RUs which are exactly fit into a 52-tone RU, and four contiguous 26-tone RUs which are exactly fit into a 106-tone RU. This may advantageously maximize tone utilization and reduce the number of user fields in an EHT MU PPDU.

Figure 5:
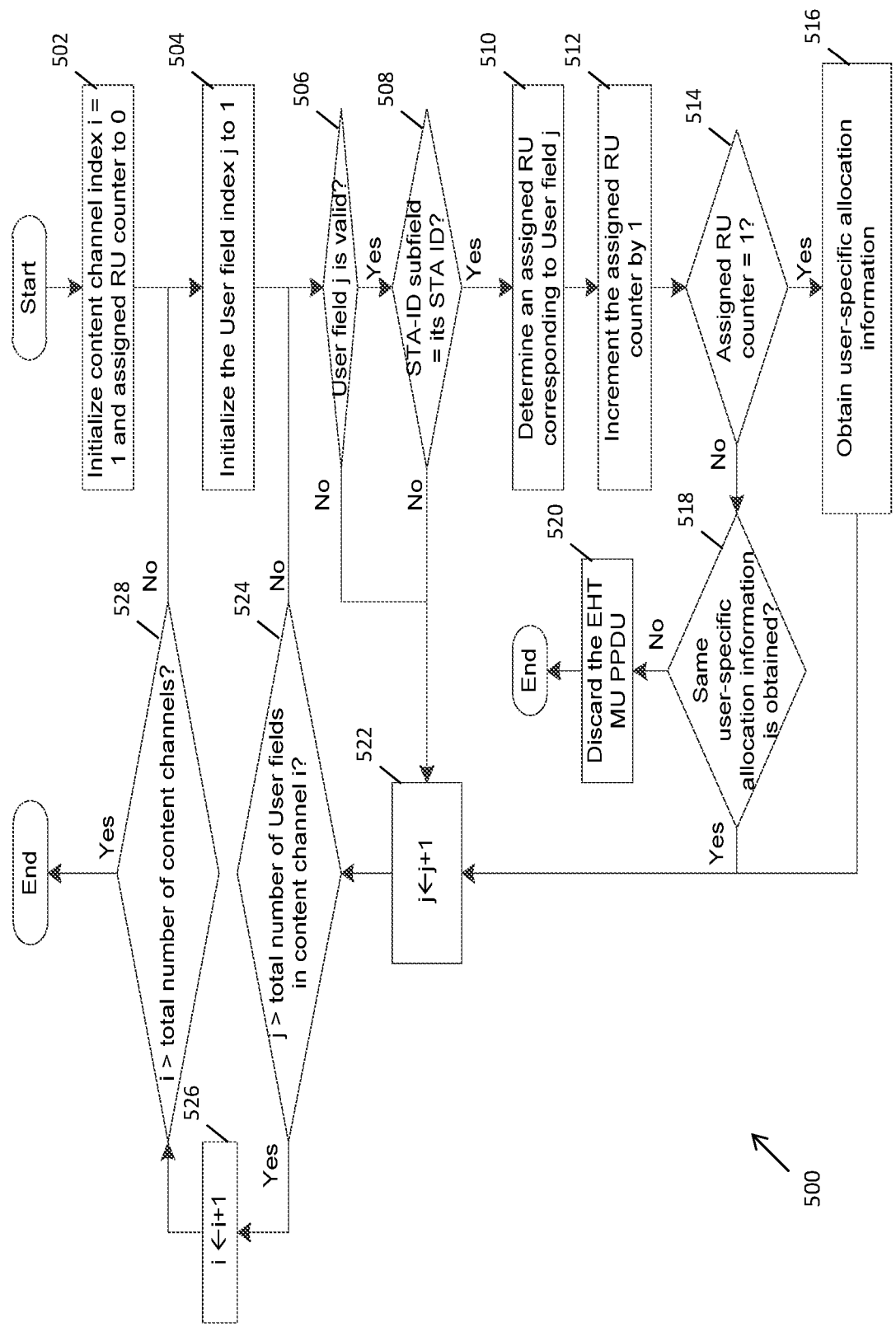
FIG. 5 depicts a flow diagram illustrating processing of a received EHT MU PPDU according to an embodiment.

FIG. 5 depicts a flow diagram 500 illustrating processing of a received EHT MU PPDU according to an embodiment. A STA is configured to process the EHT-SIG-B field of the received EHT MU PPDU to search for one or more RUs that are assigned to it. In step 502, EHT-SIG-B content channel index i may be initialized to 1, indicating a first EHT-SIG-B content channel of the EHT-SIG-B field, and assigned RU counter may be initialized to 0. In step 504, the user field index j may be initialized to 1 indicating a first user field of the EHT-SIG-B content channel i. In step 506, User field j may be determined if User field j is valid, User field j being invalid when the CRC check of the User Block field containing User field j fails. In response to determining User field j is valid, step 508 is carried out. In step 508, it is determined if STA ID subfield value of User field j matches with the STA's ID. In response to determining the STA ID subfield value matches the STA's ID, step 510 is then carried out. In step 510, an assigned RU corresponding to User field j is determined from RU allocation information in the Common field and the position of User field j in the User Specific field of the EHT-SIG-B content channel i. In step 512, the assigned RU counter may be incremented by 1. In step 514, it is determined if the assigned RU counter is 1. In response to determining the assigned RU counter is 1, indicating one RU (the first RU) has been assigned to the STA, step 516 is carried out to obtain user-specific allocation information and the processing is directed to step 522. In step 514, if the assigned RU counter is not equal to 1, indicating more than one RUs have been assigned to the STA, step 518 is carried out instead. In step 518, it is determined if User field j contains a same user-specific allocation information as previously obtained from another user field (for example User field j–2). If User field j does not contain the same user-specific allocation information, the received EHT MU PPDU may be identified as containing an error. The EHT MU PPDU is then discarded in step 520. In step 518, if User field j contains the same user-specific allocation information, the processing is directed to step 522.

Returning to step 506, User field j may be determined as not valid, for example the CRC check of the User Block field containing User field j contains fails. In this case, User field j is not further processed and the processing of the received EHT MU PPDU will be directed to step 522. Similarly, in step 508, if the STA ID subfield value does not match the STA's ID, User field j is not further processed and the processing is directed to step 522.

In step 522, the user field index j may be incremented by 1. In step 524, the incremented index value j is then determined if the value is larger than the total number of user fields in EHT-SIG-B content channel i. If the incremented index value j is not larger than the total number of user fields in EHT-SIG-B content channel i, indicating that at least one user field in the EHT-SIG-B content channel i has not been processed, step 506 is then carried out using the user field with incremented index j. If the incremented index value j is larger than the total number of user fields in EHT-SIG-B content channel i, step 526 is carried out instead. In step 526, index i is incremented by 1. In step 528, the incremented index value i is then determined if the value is larger than the total number of EHT-SIG-B content channels. If the incremented index value i is not larger than the total number of EHT-SIG-B content channels, indicating that at least one EHT-SIG-B content channel has not been processed, step 504 is then carried out using the user field in EHT-SIG-B content channel with incremented index i. If the incremented index value i is larger than the total number of EHT-SIG-B content channels, indicating all user fields in all EHT-SIG-B content channels have been processed, the processing of the received EHT MU PPDU may end.

According to an embodiment of the present disclosure, one or more user fields corresponding to one or more RUs assigned to a STA shall contain the same user-specific allocation information, i.e., the one or more user fields corresponding to the one or more RUs assigned to a STA shall have same subfield values. In response to determining the assigned RU counter is not 1 in step 514, indicating two or more RUs have been assigned to the STA, in step 518, it is the determined if User field j contains a same user-specific allocation information as previously obtained from another user field (for example User field j–2). In response to determining User field j contains the same user-specific allocation information, the user-specific allocation information of User field j is not obtained, and the index j is incremented by 1 in step 522 which may correspond to the next User field j+1 (if any). On the other hand, in response to determining User field j does not contain the same user-specific allocation information, the received EHT MU PPDU may be identified as containing an error and is then discarded in step 520. Such error may occur when decoding user fields corresponding to multiple RUs assigned to the STA but belonging to different User Block fields.

According to the present disclosure, if more than one RUs are assigned to a STA, all user fields corresponding to the more than one RUs assigned to the STA shall contain the same user-specific allocation information. In this case, obtaining user-specific allocation information from one of the user fields addressed to the STA may be sufficient, while each of the other user fields addressed to the STA may contain information which can help the STA search and locate its user fields. This may advantageously increase the STA's power efficiency.

The first user field addressed to a STA refers to the EHT-SIG-B content channel with the lowest index i which contains at least one user field addressed to the STA; while the last user field addressed to a STA refers to the EHT-SIG-B content channel with the highest index i which contains at least one user fields addressed to the STA. For example, where bandwidth is 40 MHz, an EHT MU PPDU with two EHT-SIG-B content channels with RU Allocation subfield of 10 and 15 respectively, each RU allocation subfield value referring to a RU assignment pattern as defined in IEEE P802.11ax/D5.0, may be received as follows: (i) an EHT-SIG-B content channel 1 with RU Allocation subfield set to 10 referring to a RU assignment pattern of 52-tone RU1, 52-tone RU2, 26-tone RU5, 52-tone RU3, 52-tone RU4, the 5 RUs corresponding to 5 user fields (UF), UF1 to UF5, in the EHT-SIG-B content channel 1; (ii) an EHT-SIG-B content channel 2 with RU allocation subfield set to 15 referring to a RU assignment pattern of 52-tone RU5, 52-tone RU6, 26-tone RU14, 52-tone RU7, 52-tone RU8, the 5 RUs corresponding to 5 user fields, UF1 to UF5, in the EHT-SIG-B content channel 2. Assuming a non-contiguous RU assignment for a STA, where 4 RUs are assigned to the STA such as 52-tone RU1 and 52-tone RU3 from EHT-SIG-B content channel 1, and 26-tone RU14 and 52-tone RU8 from EHT-SIG-B content channel 2, the first user field addressed to the STA is the UF1 in the EHT-SIG-B content channel 1, and the last user field addressed to the STA is the UF5 in EHT-SIG-B content channel 2.

According to an embodiment of the present disclosure, there are two types of user fields: a type 1 user field contains user-specific allocation information; while a type 2 user field does not contain user-specific allocation information but include some RU assignment information which assists another communication apparatus, for example an intended STA, in expediting search for its remaining user fields. Each user field contains a signaling, such as a UF Type subfield of the user field, for indicating if the user field is a type 1 user field or a type 2 user field. For example, a UF Type subfield is set to 0 to indicate a type 1 user field and is set to 1 to indicate a type 2 user field. In an embodiment, when a single RU is assigned to a STA, a type 1 User field shall correspond to the assigned RU. In such embodiment, a STA is able to determine a single RU assignment after identifying its type 1 user field with the Single RU Assignment Flag subfield set to 1. Details of type 1 user field subfields for non-MU-MIMO and MU-MIMNO allocations can be found in Tables 3 and 4, respectively.

Table 3 indicates type 1 user field subfields for a non-MU-MIMO allocation in more detail.

| Subfield | Number of bits | Description |
|---|---|---|
| STA-ID | 11 | |
| UF Type | 1 | Set to 0 to indicate type 1 user field; and set to 1 to indicate type 2 user field. |
| UF in Different Content Channel Flag | 1 | Set to 1 to indicate at least one user field addressed to an intended STA is present in a different EHT-SIG-B content channel; and set to 0 otherwise. This field is set to 0 when the Single RU Assignment Flag subfield is set to 1. |
| Single RU Assignment Flag | 1 | Set to 1 to indicate a single RU is assigned to an intended STA; and set to 0 otherwise. |
| NSTS | 4 | |
| Tx BF | 1 | |
| DCM | 1 | |
| MCS | 4 | |
| Coding | 1 | |

Table 4 indicates type 1 user field subfields for a MU-MIMO allocation in more detail

| Subfield | Number of bits | Description |
|---|---|---|
| STA-ID | 11 | |
| UF Type | 1 | Set to 0 to indicate type 1 user field; and set to 1 to indicate type 2 user field. |
| UF in Different Content Channel Flag | 1 | Set to 1 to indicate at least one user field addressed to an intended STA is present in a different EHT-SIG-B content channel; and set to 0 otherwise. This field is set to 0 when the Single RU Assignment Flag subfield is set to 1. |
| Single RU Assignment Flag | 1 | Set to 1 to indicate a single RU is assigned to an intended STA; and set to 0 otherwise. |
| Spatial configuration | 6 | |
| MCS | 4 | |
| Coding | 1 | |

In another embodiment, when multiple non-contiguous RUs are assigned to a STA, the last user field addressed to the STA shall be a type 1 user field and each of remaining user fields addressed to the STA shall be a type 2 user field. According to this embodiment, only one user field in the User Specific field includes the user-specific allocation information for the multiple RUs assigned to the STA. The Contiguous RU Assignment Flag subfield in the type 2 user field may be set to 0 to indicate that multiple non-contiguous RUs are assigned to the STA. In such embodiment, a STA may be able to: (i) easily position the next user field addressed to it after identifying a type 2 user field address to the STA, (ii) determine the total number of assigned RUs after identifying a type 1 user field addressed to the STA, (iii) obtain RU assignment information and user-specific allocation information from all of the user fields addressed to the STA. Details of each subfield contained in a type 2 user field can be found in Table 5. Details of the Assigned RU Info subfield when the contiguous RU Assignment Flag subfield is set to 0 indicating multiple non-contiguous RUs are assigned to a STA can be found in Table 6.

Table 5 indicates type 2 user field subfields in more detail.

| Subfield | Number of bits | Description |
|---|---|---|
| STA-ID | 11 | |
| UF Type | 1 | Set to 0 to indicate type 1 user field; and set to 1 to indicate type 2 user field. |

-continued

| Subfield | Number of bits | Description |
|---|---|---|
| Contiguous RU Assignment Flag | 1 | Set to 1 to indicate multiple contiguous RUs assigned to an intended STA; set to 0 otherwise. |
| Number of Assigned RUs | 3 | Indicate the total number of RUs assigned to an intended STA. |
| Assigned RU Info | 9 | Depends on the value of Contiguous RU Assignment Flag subfield |

Table 6 indicates the Assigned RU Info subfield when the contiguous RU Assignment Flag subfield is set to 0.

| Subfield | Number of bits | Description |
|---|---|---|
| Next Assigned RU | 9 | Indicate the next RU assigned to an intended STA (equivalently the next user field addressed to the intended STA) |

In an embodiment when multiple contiguous RUs are assigned to a STA, there are two options of configuring the types of user fields addressed to a STA. The first option is that the last user field addressed to the STA shall be a type 1 user field and each of remaining user fields addressed to the STA shall be a type 2 user field. According to this option, only one user field in the User Specific field includes the user-specific allocation information for the multiple RUs assigned to the STA. The Contiguous RU Assignment Flag subfield in the type 2 user field may be set to 1 to indicate that multiple contiguous RUs are assigned to a STA. In such embodiment, a STA may be able to easily position the remaining User fields addressed to it after identifying the first user field addressed to it. This may advantageously minimize the specification impact since a same rule is applied when multiple non-contiguous or contiguous RUs are assigned to a STA. In the embodiment when multiple contiguous RUs are assigned to a STA, the second option of configuring the types of user fields addressed to the STA is that the user fields addressed to the STA shall alternatively be type 1 user fields or type 2 user fields, and the first user field addressed to the STA shall be a type 2 User field. As such, a STA is able to: (i) easily position the remaining user fields addressed to it after identifying the first user fields addressed to it; and (ii) obtain RU assignment information and user-specific allocation information from any two adjacent type 1 and type 2 user fields. Such utilization of type 1 and type 2 User fields may advantageously expedite the search for all of user fields addressed to a STA when multiple contiguous RUs are assigned to the STA, and thus increases the STA's power efficiency. Details of the Assigned RU Info subfield when the Contiguous RU Assignment Flag subfield is set to 1 indicating multiple contiguous RUs are assigned to a STA can be found in Table 7.

Table 7 indicates the Assigned RU info subfield when Contiguous RU Assignment Flag subfield is set to 1.

| Subfield | Number of bits | Description |
|---|---|---|
| RU Position | 3 | Indicate the position of RU corresponding to this user field among all the RUs assigned to an intended STA (equivalently the position of this user field among all the user fields addressed to an intended STA). |
| Reserved | 6 | |

Table 9 depicts an example EHT-SIG-B content channel comprising RU allocations assigned to three STAs, for example STA1, STA2 and STA3, where bandwidth is 20 MHz. The EHT-SIG-B content channel may comprise a Common Field comprising a RU Allocation subfield and a User-Specific field comprising seven user fields, for example UF1 to UF7. The RU Allocation subfield in the Common field has a value of 10 which refers to RU allocations of 52-tone RU1, 26-tone RU3, 26-tone RU4, 26-tone RU5, 52-tone RU3, 26-tone RU8, 26-tone RU9. Each of the RU allocations corresponds to one of the user fields UF1 to UF7.

One example RU assignment of the seven RUs to three STAs may be as follows: three non-contiguous RUs may be assigned to STA1, for example 52-tone RU1, 52-tone RU3 and 26-tone RU9 which corresponds to UF1, UF5 and UF7 respectively; a single RU may be assigned to STA2, for example 26-tone RU8 which corresponds to UF6; and three contiguous RUs may be assigned to STA3, for example 26-tone RU3, 26-tone RU4 and 26-tone RU5 which corresponds to UF2 to UF4 respectively.

Regarding the three non-contiguous RUs assigned to STA1, the last user field addressed to STA1, i.e. UF7, is a type 1 user field (UF Type subfield=0) and each of the remaining user fields addresses to STA1, i.e. UF1 and UF5, is a type 2 user field (UF Type subfield=1). Specifically, in the type 1 user field (UF7) addressed to STA1, the Single RU Assignment Flag subfield is set to 0 indicating a multiple RU is assigned to STA1. On the other hand, in the type 2 user fields (UF1 and UF5) addressed to STA1, the Contiguous RU Assignment Flag subfields are set to 0 indicating multiple non-contiguous RUs are assigned to STA1, and the Number of Assigned RUs subfields are set to 3 indicating a total number of three RUs are assigned to STA1. As such, the Assigned RU Info subfields of UF1 and UF5 refer to Next Assigned RU subfields, indicating the next RU that is assigned to STA1. In this case, the Next Assigned RU subfield of UF1 is indicated as 52-tone RU3 which corresponds to UF5, and the Next Assigned RU subfield of UF5 is indicated as 26-tone RU9 which corresponds to UF7. As such, STA1 is able to easily position the next user field addressed to it after identifying the UF1 and UF5 (type 2 user fields) addressed to it.

Regarding the single RU 26-tone RU8 assigned to STA2, the user field corresponding to the assigned RU, i.e. UF6, is a type 1 user field (UF Type subfield=0). Specifically, in the type 1 user field (UF6) addressed to STA2, the Single RU Assignment Flag subfield is set to 1 indicating a single RU is assigned to STA2. Regarding the three contiguous RUs assigned to STA3, a same rule as that of non-contiguous RU assignment can be applied, that is, the last user fields addressed to STA3, i.e. UF4, is a type 1 user field (UF Type subfield=0), and each of the remaining user fields addressed to STA3, i.e. UF2 and UF3, is a type 2 user field (UF Type subfield=1). Specifically, in the type 1 user field (UF4) addressed to STA3, the Single RU Assignment Flag subfield is set to 0 indicating multiple RUs are assigned to STA1. On the other hand, in the type 2 user fields (UF2 and UF3) addressed to STA3, the Contiguous RU Assignment Flag subfields are set to 1 indicating multiple contiguous RUs are assigned to STA1, and the Number of Assigned RUs subfields are set to 3 indicating a total number of three RUs are assigned to STA3. As such, the Assigned RU info subfield of UF2 or UF3 refer to RU Position subfield, indicating the position of RU corresponding to the User field among all the RUs assigned to STA3. In this case, the RU Position subfield of UF2 is indicated as $1^{st}$ RU indicating the RU corresponding to UF2 is the first RU among the three RUs assigned to STA3 (Number of Assigned RUs subfield=3), while the RU Position subfield of UF3 is indicated as $2^{nd}$ RU indicating the RU corresponding to UF3 is the second RU among the three RUs assigned to STA3.

Table 10 and 11 depict an example EHT-SIG-B content channel 1 and an example EHT-SIG-B content channel 2 comprising RU allocations assigned to four STAs, for example STA1, STA2, STA3 and STA4, respectively, where bandwidth is 40 MHz. Each EHT-SIG-B content channel may comprise a Common Field comprising a RU Allocation subfield and a User-Specific field comprising five User fields, for example UF1 to UF5. The RU Allocation subfield in the Common field of the EHT-SIG-B content channel 1 has a value of 10, which refers to RU allocations of 52-tone RU1, 52-tone RU2, 26-tone RU5, 52-tone RU3, 52-tone RU4. Each of the RU allocations corresponds to one of the user fields UF1 to UF5 in the EHT-SIG-B content channel 1. The RU Allocation subfield in the Common field of the EHT-SIG-B content channel 2 has a value of 15, which refers to RU allocation of 52-tone RU5, 52-tone RU6, 26-tone RU14, 52-tone RU7, 52-tone RU8. One example RU assignment of the ten RUs to four STAs may be as follows: three non-contiguous RUs may be assigned to STA1, for example 52-tone RU1, 26-tone RU14 and 52-tone RU8 which corresponds to UF1 of EHT-SIG-B content channel 1 and UF5 and UF7 in EHT-SIG-B content channel 2 respectively; two non-contiguous RUs may be assigned to STA2, for example 52-tone RU2 and 52-tone RU7 which corresponds to UF2 in EHT-SIG-B content channel 1 and UF4 in EHT-SIG-B content channel 2; a single RU may be assigned to STA3, for example 26-tone RU5 which corresponds to UF3 in EHT-SIG-B content channel 1; and four contiguous RUs may be assigned to STA4, for example 52-tone RU3, 52-tone RU4, 52-tone RU5, and 52-tone RU6 which corresponds to UF4 and UF5 in EHT-SIG-B content channel 1 and UF1 and UF2 in EHT-SIG-B content channel 2 respectively.

Regarding the three non-contiguous RUs assigned to STA1, the last user field addressed to STA1, i.e. UF5 of EHT-SIG-B content channel 2, is a type 1 user field (UF Type subfield=0) and each of the remaining user fields addresses to STA1, i.e. UF1 of EHT-SIG-B content channel 1 and UF3 of EHT-SIG-B content channel 2, is a type 2 user field (UF Type subfield=1). Specifically, in the type 1 user field (UF5 of EHT-SIG-B content channel 2) addressed to STA1, the UF in Different Content Channel Flag subfield is set to 1 indicating at least one user field addressed to STA1 is present in a different EHT-SIG-B content channel, and Single RU Assignment Flag subfield is set to 0 indicating multiple RUs are assigned to STA1. On the other hand, in the type 2 user fields (UF1 of EHT-SIG-B content channel 1 and UF3 of EHT-SIG-B content channel 2) addressed to STA1, the Contiguous RU Assignment Flag subfields are set to 0 indicating multiple non-contiguous RUs are assigned to STA1, and the Number of Assigned RUs subfields are set to 3 indicating a total number of three RUs are assigned to STA1. As such, the Assigned RU Info subfields refer to Next Assigned RU subfields, indicating the next RU that is assigned to STA1. In this case, the Next Assigned RU subfield of UF1 of EHT-SIG-B content channel 1 is indicated as 26-tone RU14 which corresponds to UF3 of EHT-SIG-B content channel 2, and the Next Assigned RU subfield of UF3 of EHT-SIG-B content channel 2 is indicated as 52-tone RU8 which corresponds to UF7. As such, STA1 is able to easily position the next user field addressed to it after identifying the UF1 of EHT-SIG-B content channel 1 and UF3 of EHT-SIG-B content channel 2 (type 2 user fields) addressed to it.

Similarly, regarding the two non-contiguous RUs assigned to STA2, the last the last user field addressed to STA2, i.e. UF4 of EHT-SIG-B content channel 2, is a type 1 user field (UF Type subfield=0) and each of the remaining user fields addresses to STA2, i.e. UF2 of EHT-SIG-B content channel 1, is a type 2 user field (UF Type subfield=1) . Specifically in the type 1 user field (UF4 of EHT-SIG-B content channel 2) addressed to STA1, the UF in Different Content Channel Flag subfield is set to 1 indicating at least one user field addressed to STA2 is present in a different EHT-SIG-B content channel, and the Single RU Assignment Flag subfield is set to 0 indicating multiple RUs are assigned to STA2. On the other hand, in the type 2 user fields (UF2 of EHT-SIG-B content channel 1) addressed to STA2, the Contiguous RU Assignment Flag subfield is set to 0 indicating multiple non-contiguous RUs are assigned to STA1, and the Number of Assigned RUs subfield is set to 2 indicating a total number of two RUs are assigned to STA2. As such, the Assigned RU Info subfields refer to Next Assigned RU subfields, indicating the next RU that is assigned to STA2. In this case, the Next Assigned RU subfield of UF2 of EHT-SIG-B content channel 1 is indicated as 52-tone RU7 which corresponds to UF4 of EHT-SIG-B content channel 2. As such, STA2 is able to easily position the next user field addressed to it after identifying the UF2 of EHT-SIG-B content channel 1 (type 2 user field) addressed to it.

Regarding the single RU 26-tone RU5 assigned to STA3, the user field corresponding to the assigned RU, i.e. UF3 of EHT-SIG-B content channel 1, is a type 1 user field (UF Type subfield=0). Specifically, in the type 1 user field (UF3 of EHT-SIG-B content channel 1) addressed to STA3, the Single RU Assignment Flag subfield is set to 1 indicating a single RU is assigned to STA3. Regarding the four contiguous RUs assigned to STA4, a same rule as that of non-contiguous RU assignment can be applied, that is, the last user fields addressed to STA4, i.e. UF2 of EHT-SIG-B content channel 2, is a type 1 user field (UF Type subfield=0), and each of the remaining user fields addressed to STA3, i.e. UF4 and UF5 of EHT-SIG-B content channel 1 and UF1 of EHT-SIG-B content channel 2, is a type 2 user field (UF Type subfield=1). Specifically, in the type 1 user field (UF2 of EHT-SIG-B content channel 2) addressed to STA4, the UF in Different Content Channel Flag subfield is set to 1 indicating at least one user field addressed to STA4 is present in a different content channel, and Single RU Assignment Flag subfield is set to 0 indicating multiple RUs are assigned to STA4. On the other hand, in the type 2 user fields (UF4 and UF5 of EHT-SIG-B content channel 1 and UF1 of EHT-SIG-B content channel 2) addressed to STA4, the Contiguous RU Assignment Flag subfields are set to 1 indicating multiple contiguous RUs are assigned to STA4, and the Number of Assigned RUs subfields are set to 4 indicating a total number of four RUs are assigned to STA4.

As such, the Assigned RU info subfields of UF2 and UF3 refer to RU Position subfield, indicating the position of RU corresponding to the user field among all the RUs assigned to STA4. In this case, the RU Position subfields of UF4 and UF5 of content channel 1 are indicated as $1^{st}$ RU and $2^{nd}$ RU indicating the RUs corresponding to UF4 and UF5 of EHT-SIG-B content channel 1 are the first RU and second RU among the four RUs assigned to STA4 (Number of Assigned RUs subfield=4), respectively, while the RU Position subfield of UF1 of EHT-SIG-B content channel 2 is indicated as 3rd RU indicating the RU corresponding to this user field is the third RU among the four RUs assigned to STA4.

Figure 6:
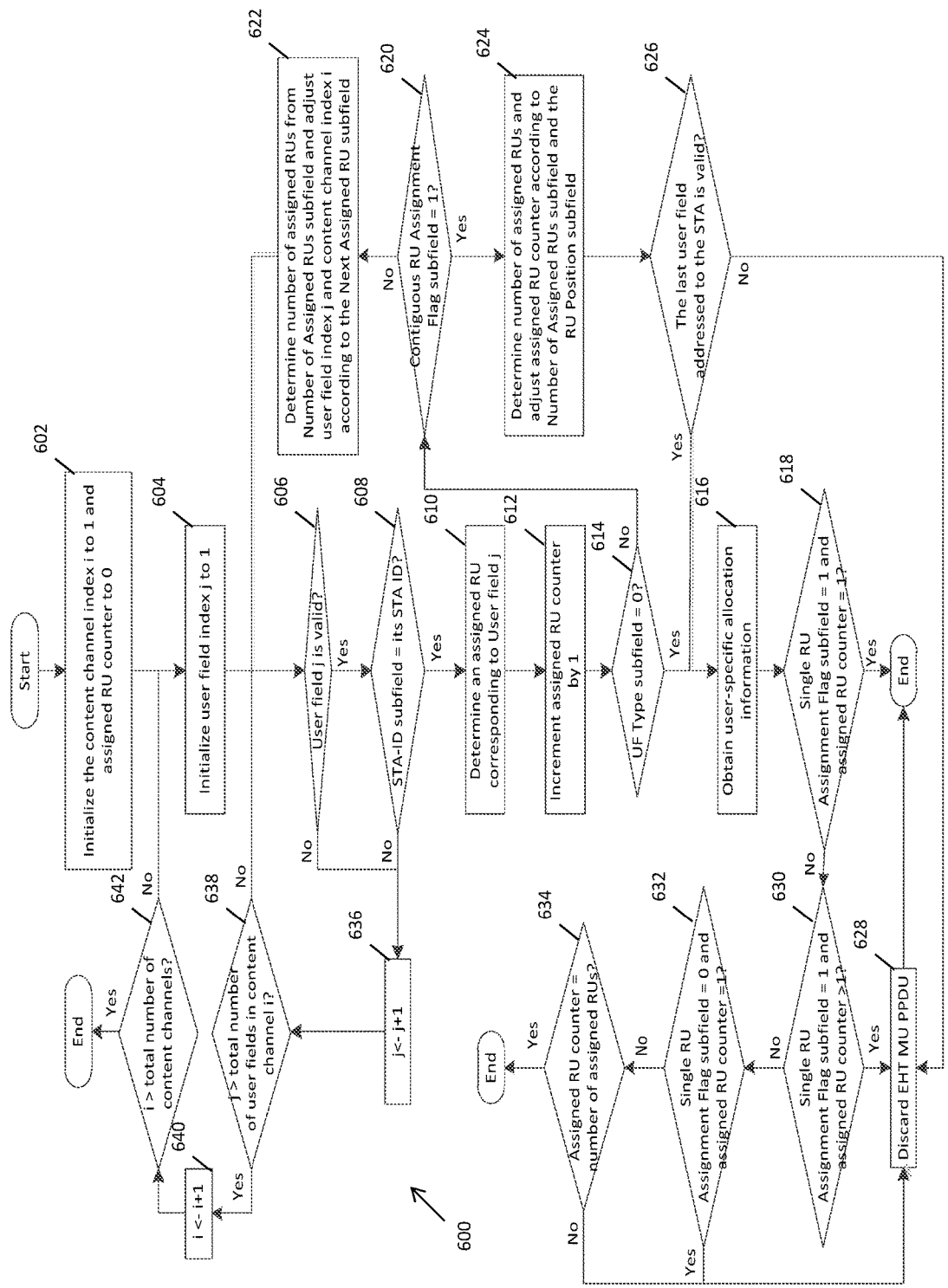
FIG. 6 depicts a flow diagram illustrating processing of a received EHT MU PPDU according to another embodiment.

FIG. 6 depicts a flow diagram 600 illustrating processing of a received EHT MU PPDU according to an embodiment. A STA is configured to process the EHT-SIG-B field of the received EHT MU PPDU to search for one or more RUs that are assigned to it. In step 602, EHT-SIG-B content channel index i may be initialized to 1, indicating a first EHT-SIG-B content channel, and assigned RU counter may be initialized to 0. In step 604, the user field index j may be initialized to 1 indicating a first user field of the EHT-SIG-B content channel i. In step 606, User field j may be determined if User field j is valid, User field j being invalid when the CRC check of the User Block field containing User field j fails. In response to determining User field j is valid, step 608 is carried out. However, if User field j is not valid, the processing is directed to step 636 instead. In step 608, it is determined if STA ID subfield value of User field j matches with the STA's ID. In response to determining the STA ID subfield value matches the STA's ID, step 610 is then carried out. However, if the STA ID subfield does not match the STA's ID, the processing is directed to step 636 instead. In step 610, an assigned RU corresponding to User field j is determined from RU allocation information in the Common field and the position of User field j in the User Specific field in EHT-SIG-B content channel i. In step 612, the assigned RU counter may be incremented by 1. In step 614, it is determined if UF Type subfield of User field j is set to 0, referring to type 1 user field. If User field j is a type 1 user field, step 616 is carried out where the user-specific allocation information is obtained. In step 618, it is determined if Single RU Assignment Flag is set to 1 and the assigned RU counter is 1. This step 618 is used to identify if the received EHT MU PPDU contains an error. In response to determining the Single RU Assignment Flag is set to 1 and the assigned RU counter is 1, indicating only one RU is assigned to the STA and there is only one user field has been identified, or in other words, the EHT MU PPDU does not contain an error, so the processing may end.

Returning to step 614, if User field j is a type 2 user field, step 620 is carried out instead. In step 620, the Contiguous RU Assignment Flag subfield of the type 2 User field j may be determined if the subfield set to 1. If the Contiguous RU Assignment Flag subfield is not set to 1, indicating that multiple non-contiguous RUs are assigned to the STA, step 622 is carried out. In step 622, number of assigned RUs is determined from Number of Assigned RUs subfield and user field index j and EHT-SIG-B content channel index i are adjusted according to the Next Assigned RU subfield. Subsequently, user field with adjusted index j in EHT-SIG-B content channel with adjusted index i is used to carry out in step 606. However, if the Contiguous RU Assignment Flag subfield is set to 1 in step 620, indicating that multiple contiguous RUs are assigned to the STA, step 624 is carried out instead. In step 624, number of assigned RUs is determined and assigned RU counter is adjusted according to Number of Assigned RUs subfield and the RU Position subfield. In step 626, the last user field addressed to the STA may be determined if it is valid, the last user field being invalid when the CRC check of the User Block field containing the last user field fails. If the last user field is valid, step 616 is carried out where user-specific allocation information is obtained; whereas if the last user field is not valid, the received EHT MU PPDU may be determined as containing an error and the EHT MU PPDU is discarded in step 628.

Returning to step 618, the step is used to identify if the EHT MU PPDU may contain an error when processing user fields. Specifically, in step 618, if one of (i) the Single RU Assignment Flag subfield is not set to 1 and (ii) the assigned RU counter is not 1, is determined, step 630 is carried out. In step 630, if it is determined the Single RU Assignment Flag is set to 1 but the assigned RU counter is more than 1, indicating a single RU shall be assigned to the STA but more than one user fields have been identified the STA, in this case, the EHT MU PPDU is then identified as containing an error and is discarded in step 628. Otherwise, step 632 is carried out. In step 632, if it is determined the Single RU Assignment Flag is set to 0 but the assigned RU counter is 1, indicating multiple RUs shall be assigned to the STA but only one user field has been identified by the STA, in this case, the EHT MU PPDU is then identified as containing an error and is discarded in step 628. Otherwise, in step 634, the assigned RU counter is checked if it matches the number of assigned RUs obtained from step 622, indicating it is the last user field (type 1 user field) addressed to the STA, and the EHT MU PPDU does not contain an error, so the processing may end.

In step 636, the user field index j may be incremented by 1. In step 628, the incremented user field index value j is then determined if the value is larger than the total number of user fields in EHT-SIG-B content channel i. If the incremented user field index value j is not larger than the total number of user fields in EHT-SIG-B content channel i, indicating that at least one user field in the EHT-SIG-B content channel i has not been processed, step 606 is then carried out using the user field with incremented index j. If the incremented user field index value j is larger than the total number of user fields in EHT-SIG-B content channel i, step 640 is carried out instead. In step 640, EHT-SIG-B content channel index i is incremented. In step 642, the incremented index value i is then determined if the value is larger than the total number of EHT-SIG-B content channels. If the incremented index value i is not larger than the total number of EHT-SIG-B content channels, indicating that at least one EHT-SIG-B content channel has not been processed, step 604 is then carried out using the first user field in EHT-SIG-B content channel with incremented index i. If the incremented index value i is larger than the total number of EHT-SIG-B content channel, indicating all user fields in all EHT-SIG-B content channels have been processed, the processing of the received EHT MU PPDU may end.

In the following paragraphs, certain exemplifying embodiments are explained with reference to an AP and multiple STAs for control signaling in uplink MU communications.

Figure 7A:
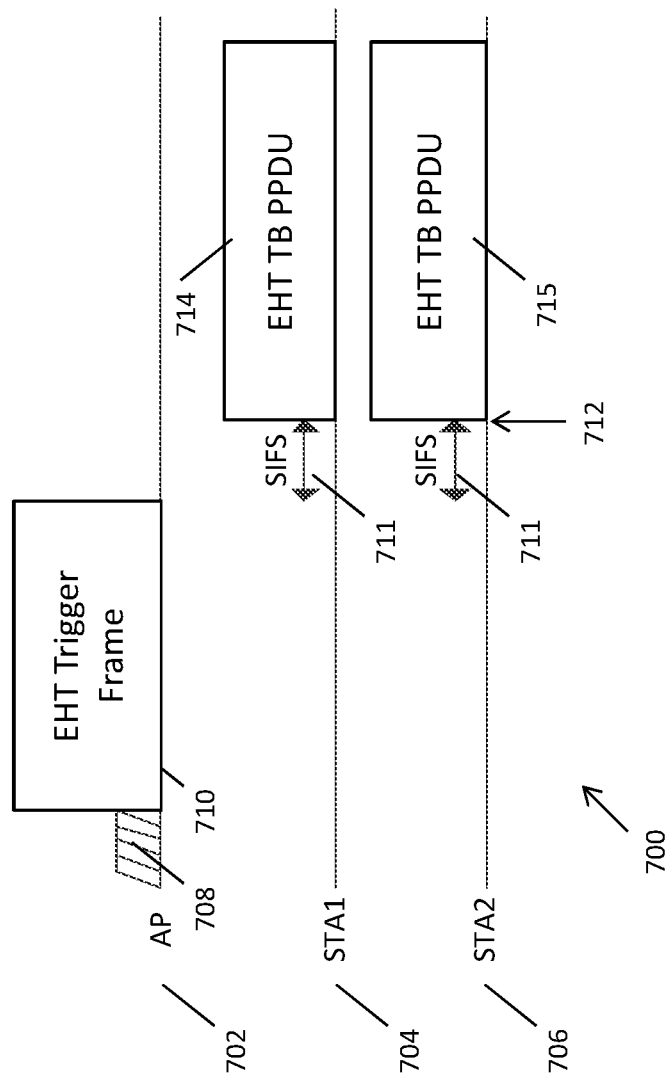
FIG. 7A depicts a flow chart illustrating an uplink MU communication between an AP and multiple STAs using an EHT Trigger frame according to various embodiments.

An EHT Trigger frame can be used to solicit EHT TB PPDU transmission in an uplink MU communication, as well as carry user-specific RU assignment information and user-specific allocation information. FIG. 7A depicts a flow chart 700 illustrating an uplink MU communication between an AP 702 and multiple STAs 704, 706 using an EHT Trigger frame according to various embodiments. Contention based channel access procedure, e.g. EDCA procedure, is illustrated by block 708, and SIFS 711 is illustrated. The AP 702 may generate a transmission signal (for example EHT Trigger frame) 710 comprising a plurality of user info fields (for example User Info fields of User Info List field in EHT Trigger frame). One or more user info fields of the plurality of user info fields are addressed to STA 704. Similarly, one or more user info fields of the plurality of user info fields are addressed to STA 706. In an embodiment, the one or more user info fields addressed to each STA 704, 706 contain same user-specific allocation information. In another embodiment, each of the plurality of user info fields is either a type 1 user info field or a type 2 user info field and contains a signaling for indicating its type; and the one or more user info fields addressed to each STA 704, 706 comprises a single type 1 user info field. According to an embodiment, the type 1 user info field contains user-specific allocation information while the type 2 user info field does not contain user-specific allocation information. In an embodiment, the type 1 user info field addressed to each STA 704, 706 contains a signaling for indicating whether a single RU is assigned to each STA 704, 706. The type 1 user info field addressed to each STA 704, 706 also contains a signaling for indicating whether multiple contiguous RUs with same RU size are assigned to each STA 704, 706. In another embodiment, if multiple non-contiguous RUs or multiple contiguous RUs with different RU sizes are assigned to each STA 704, 706, the one or more user info fields addressed to each STA 704, 706 comprises at least one type 2 user info field. Each of the at least one type 2 user info field contains a signaling for indicating one or more additional RUs assigned to each STA 704, 706. The radio transmitter of AP 702 may transmit the generated transmission signal 710 to STAs 704, 706.

The radio receivers of STAs 704, 706 may receive the transmission signal 710, and the circuitries of STAs 704, 706 may process the received transmission signal 710, respectively. After the last symbol of the transmission signal 710 is transmitted, a SIFS 711 may take effect, and at 712, the radio transmitters of STAs 704, 706 may simultaneously transmit their respective EHT TB PPDUs 714, 715 based on the user-specific RU assignment information and user-specific allocation information contained in the one or more user info fields addressed to the STAs 704, 706.

Figure 7B:
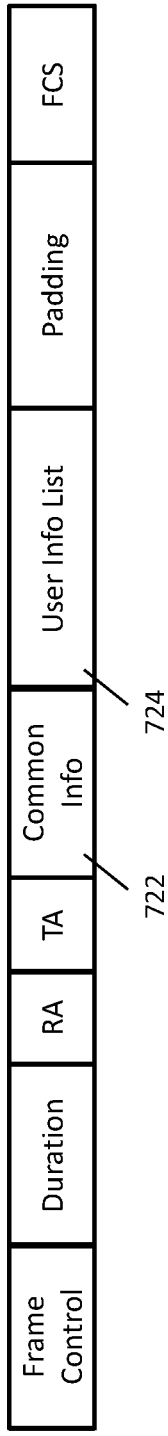
FIG. 7B depicts an example format of EHT Trigger frame.
Figure 7C:
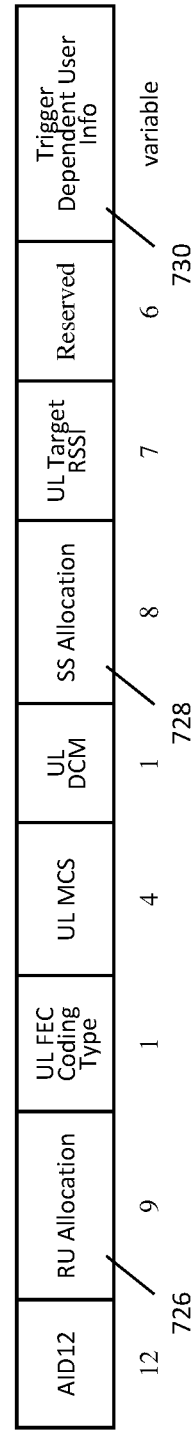
FIG. 7C depicts the user info field of the EHT Trigger frame in more detail.

FIG. 7B depicts an example format of EHT Trigger frame 700. An EHT Trigger frame 720 may include a Frame Control field, a Duration field, a RA (recipient STA address) field, a TA (transmitting STA address) field, a Common Info field 722, a User Info List field 724 which contains one or more user info fields, a Padding field and a FCS (frame check sequence) field. The Frame Control field, the Duration field, the RA field and the TA field may be grouped in a MAC header of the EHT Trigger frame 720. The Common Info field 722, the User Info List field 724 and the Padding field may be grouped in a frame body of the EHT Trigger frame 720. The Common Info field 722 contains common parameters for all STAs that are engaged in the uplink MU communications solicited by the EHT Trigger frame 720. FIG. 7C depicts the user info field 724a of the EHT Trigger frame in more detail. The User Info List field 724 may contain one or more user info field, like User Info field 724a, each of the one or more user info field may include an AID12 subfield, a RU Allocation subfield 726, a UL FEC (forward error correction) Coding Type subfield, a UL MCS subfield, a UL DCM (dual carrier modulation) subfield, a Spatial Stream (SS) Allocation subfield 728, a UL Target RSSI (received signal strength indicator) subfield and a Trigger Dependent User Info subfield 730. Each user info field 724a contains user-specific RU assignment information and user-specific allocation information, where user-specific RU assignment information comprises information on the RU allocation subfield 726. Specifically, in uplink MU communications, user-specific allocation information at least comprises information on the UL FEC Coding Type subfield, the UL MCS subfield, the UL DCM subfield, the SS Allocation subfield, and the UL Target RSSI subfield. The RU allocation field may have a size of 9 bits to support 320 MHz bandwidth and SS Allocation subfield may have a size of 8 bits to support up to 16 spatial streams.

According to the present disclosure, one or more RUs may be assigned to a STA in an EHT TB PPDU; and a single transmission scheme is applied to the one or more RUs assigned to the STA in an EHT TB PPDU. According to an embodiment, the number of user info fields addressed to a STA is the same as the number of RUs assigned to the STA. As such, a user info field addressed to a STA uniquely corresponds to a RU assigned to the STA. All the user fields addressed to a STA shall contain the same user-specific allocation information, i.e., all the subfields except the RU Allocation subfields of all the user info fields addressed to a STA shall have the same subfield values. In an embodiment, all the user info fields addressed to a STA are consecutively placed in the User Info List field. This may advantageously expedite the search for all of user info fields addressed to a STA and thus the STA's power efficiency can be increased. In an embodiment, two or more contiguous RUs with the same RU size shall not be assigned to a STA if the two or more contiguous RUs are exactly fit into a single RU with a larger size. For example, two contiguous 26-tone RUs which are exactly fit into a 52-tone RU, and four contiguous 26-tone RUs which are exactly fit into a 106-tone RU. This may advantageously maximize tone utilization.

Table 8 depicts an example User Info List field in an EHT Trigger frame comprising RU allocations assigned to four STAs, for example STA1, STA2, STA3 and STA4, where bandwidth is 40 MHz. For example, the User Info List field may comprise ten user info fields. Each of the user info fields comprises RU Allocation subfield indicating RU allocation information. The User Info List field may indicate RU allocations such as 52-tone RU1, 52-tone RU2, 26-tone RU5, 52-tone RU3, 52-tone RU4, 52-tone RU5, 52-tone RU6, 26-tone RU14, 52-tone RU7 and 52-tone RU8, where each of the ten RUs corresponds to one user info fields based on the RU Allocation subfield. All of user info fields (UIFs) addressed to a STA are consecutively placed in the User Info List field. For example, the first three user info fields, i.e. UIF1 to UIF3, are addressed to STA1 corresponding to three non-contiguous RU allocation for STA1, e.g. 52-tone RU1, 26-tone RU14 and 52-tone RU8; the consecutive two user info fields, i.e. UIF4 and UIF5, are addressed to STA2 corresponding to two non-contiguous RU allocation for STA2, e.g. 52-tone RU2 and 52-tone RU7; UIF6 is addressed to STA3 corresponding to single RU allocation for STA3, e.g. 26-tone RU5; and the consecutive user info fields, i.e. UIF7 to UIF10, are addressed to STA4 corresponding to four contiguous RU allocation for STA4, e.g. 52-tone RU3, 52-tone RU4, 52-tone RU5 and 52-tone RU6.

Table 8 indicates user info fields in User Info List field of EHT Trigger frame, and their corresponding AID12 subfield and RU Allocation subfield.

| User Info List | AID12 | RU Allocation subfield |
|---|---|---|
| UIF1 | STA1's AID | 52-tone RU1 |
| UIF2 | STA1's AID | 26-tone RU14 |
| UIF3 | STA1's AID | 52-tone RU8 |
| UIF4 | STA2's AID | 52-tone RU2 |
| UIF5 | STA2's AID | 52-tone RU7 |
| UIF6 | STA3's AID | 26-tone RU5 |
| UIF7 | STA4's AID | 52-tone RU3 |
| UIF8 | STA4's AID | 52-tone RU4 |
| UIF9 | STA4's AID | 52-tone RU5 |
| UIF10 | STA4's AID | 52-tone RU6 |

Figure 8:
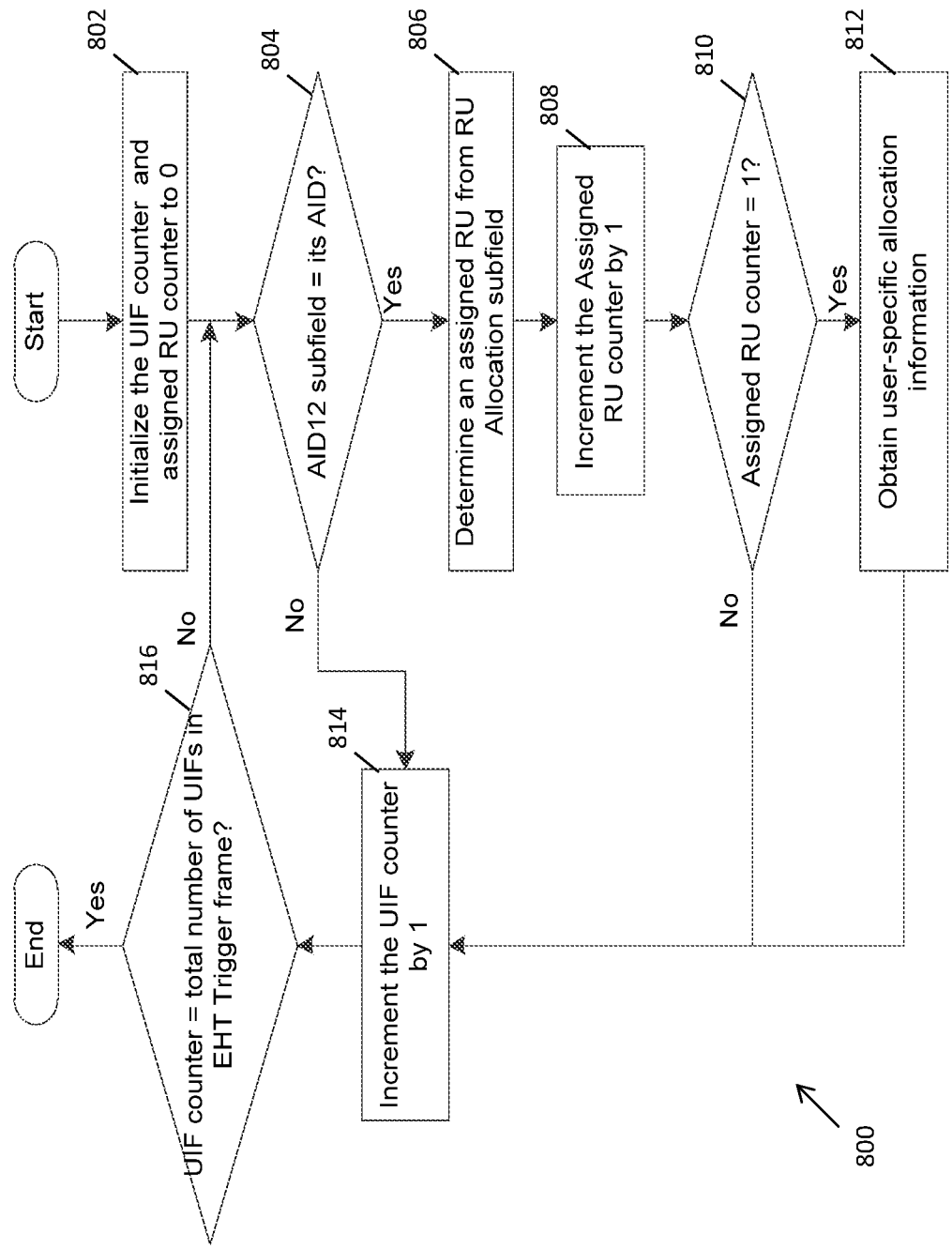
FIG. 8 depicts a flow diagram illustrating processing of a received EHT Trigger frame according to an embodiment.

FIG. 8 depicts a flow diagram illustrating processing of a received EHT Trigger frame according to an embodiment. A STA is configured to process the User Info List field in the EHT Trigger frame to search for one or more RUs that are assigned to it. In step 802, the UIF counter and assigned RU counter may be initialized to 0, the UIF counter counting the number of user info fields in the User Info List field that have been processed. In step 804, the AID12 subfield of the user info field may be determined if it matches the STA's AID (association identifier). In response to determining if the AID12 subfield matches the STA's ID, step 806 is carried out. However, if the AID subfield does not match the STA's ID, the processing is directed to 814 instead. In step 806, an assigned RU is determined from RU Allocation subfield. In step 808, the assigned RU counter may be incremented by 1. In step 810, it is determined if the assigned RU counter is 1. In response to determining the assigned RU counter is 1, indicating one RU (the first RU) has been assigned to the STA, step 812 is carried out and user-specific allocation information is obtained. After the user-specific allocation information is obtained, the processing is directed to step 814. On the other hand, in step 810, in response to determining the assigned RU counter is not equal to one, specifically larger than one, indicating more than one RUs have been assigned to the STA, the processing is directed to step 814.

In step 814, the UIF counter is incremented by 1. In step 816, it is determined if the UIF counter is equal to the total number of user info fields in the EHT Trigger frame. In response to the UIF counter is not equal to the total number of user info fields in the EHT Trigger frame, indicating not all the user info fields in the EHT Trigger frame have been processed, step 804 is carried out using the consecutive user info field. However, in step 816, if the UIF counter equal to the total number of user info fields in the EHT Trigger frame, indicating all the user info fields in the EHT Trigger frame have been processed, the processing of the received EHT Trigger frame may end.

According to an embodiment of the present disclosure, there are two types of user info fields in an EHT Trigger frame: a type 1 user info field contains user-specific allocation information and is used as the first user info field addressed to a STA; while a type 2 user info field does not contain user-specific allocation information, and is used particularly as any following user info field addressed to a STA, which is used in the case where either multiple non-contiguous RUs or multiple contiguous RUs with different RU sizes are assigned to a STA. Each user Info field contains a signaling, such as a UIF Type subfield, for indicating if the user info field is a type 1 user info field or a type 2 user info field. For example, a UIF Type subfield is set to 0 to indicate a type 1 user info field and is set to 1 to indicate a type 2 user Info field. In an embodiment, when a single RU or multiple contiguous RUs with same RU size are assigned to a STA or assigned for random access, a single type 1 user field is used to carry user-specific RU assignment information and user-specific allocation information. In another embodiment, when multiple non-contiguous RUs or multiple contiguous RUs with different RU sizes are assigned to a STA or assigned for random access, a type 1 user field or one or more type 2 user info fields are used to carry user-specific RU assignment information and user-specific allocation information. Yet in another embodiment, The AID12 subfield of a type 1 or type 2 user info field is set to a first special value (e.g. 0) to indicate the type 1 or type 2 user Info field allocates one or more random access RU to associated STAs; and is set to a second special value (e.g. 2045) to indicate the type 1 or type 2 user info field allocates one or more random access RU to unassociated STAs. By utilizing type 1 and type 2 user info fields to carry user-specific RU assignment information, the number of user info fields addressed to a STA is smaller than the number of RUs assigned to the STA when two or more RUs are assigned to the STA. This may advantageously reduce channel overhead.

Figure 9A:
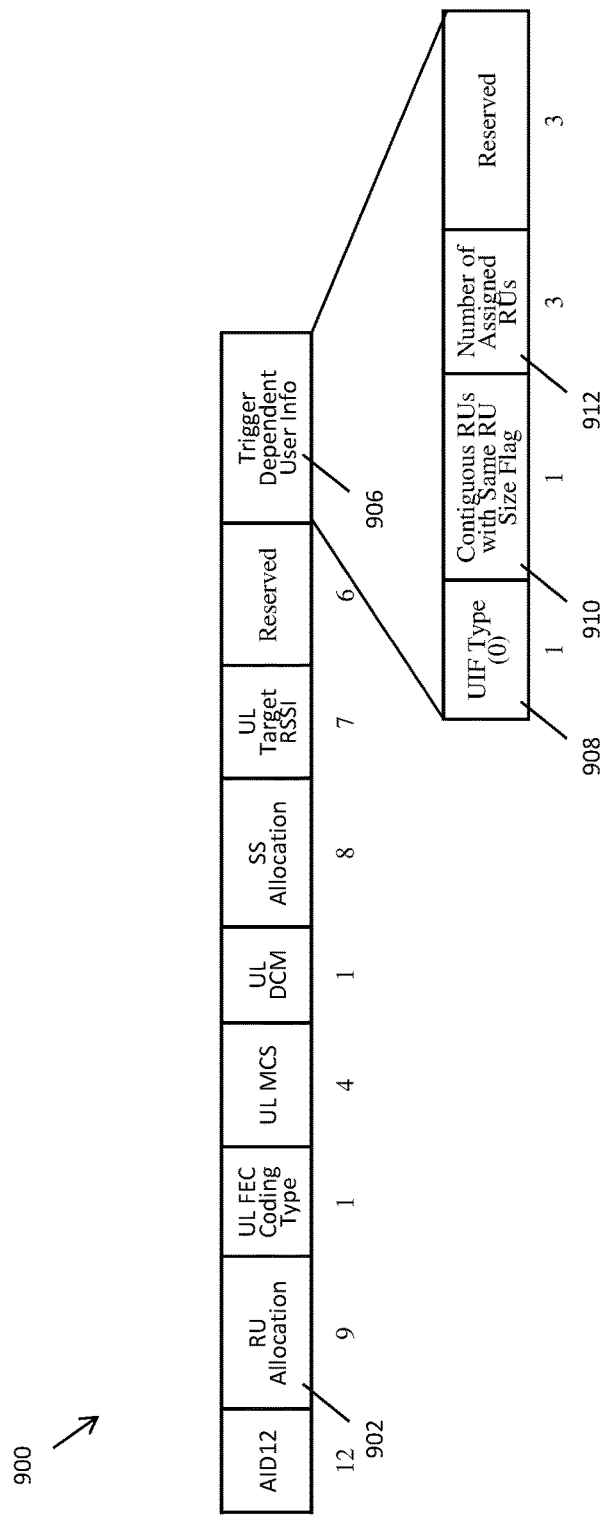
FIG. 9A depicts an example type 1 user info field of the EHT Trigger frame.

FIG. 9A depicts an example type 1 user info field 900 of the EHT Trigger frame. A type 1 user Info field 900 may include (or consist of) an AID12 subfield, a RU Allocation subfield 902, a UL FEC Coding Type subfield, a UL MCS subfield, a UL DCM subfield, an SS Allocation subfield, a UL Target RSSI subfield and a Trigger Dependent User Info subfield 906. The Trigger Dependent User Info field 906 may further comprises an UIF Type subfield (set to 0 to indicate a type 1 user info field), a Contiguous RUs with Same RU Size Flag subfield 910 and a Number of Assigned RUs subfield 912. As in uplink MU communications, the user-specific allocation information at least comprises information on the UL FEC Coding Type subfield, the UL MCS subfield, the UL DCM subfield, the SS Allocation subfield and the UL Target RSSI subfield of the EHT Trigger frame, whereas user-specific RU assignment information, such as an assigned RU used as the first RU assigned to a STA, may be included in the RU Allocation subfield 902 of the EHT Trigger frame. The Contiguous RUs with Same RU Size Flag subfield 910 is set to 1 to indicate a single RU or multiple contiguous RUs with same RU size assigned to a STA. When the UIF Type subfield 908 is set to 0 (type 1 user info field) and the Contiguous RUs with Same RU Size Flag subfield 910 is set to 1, the Number of Assigned RUs subfield indicates the number of contiguous RUs assigned to a STA; when the UIF Type subfield 908 is set to 0 (type 1 user info field) and the Contiguous RUs with Same RU Size Flag subfield 910 is set to 0, the Number of Assigned RUs indicates the number of remaining RUs assigned to a STA; and when the UIF Type subfield 908 is set to 0 (type 1 user info field), the Contiguous RUs with Same RU Size Flag subfield 910 is set to 1 and the Number of Assigned RUs subfield is set to 1, only a single RU is assigned to a STA.

Figure 9B:
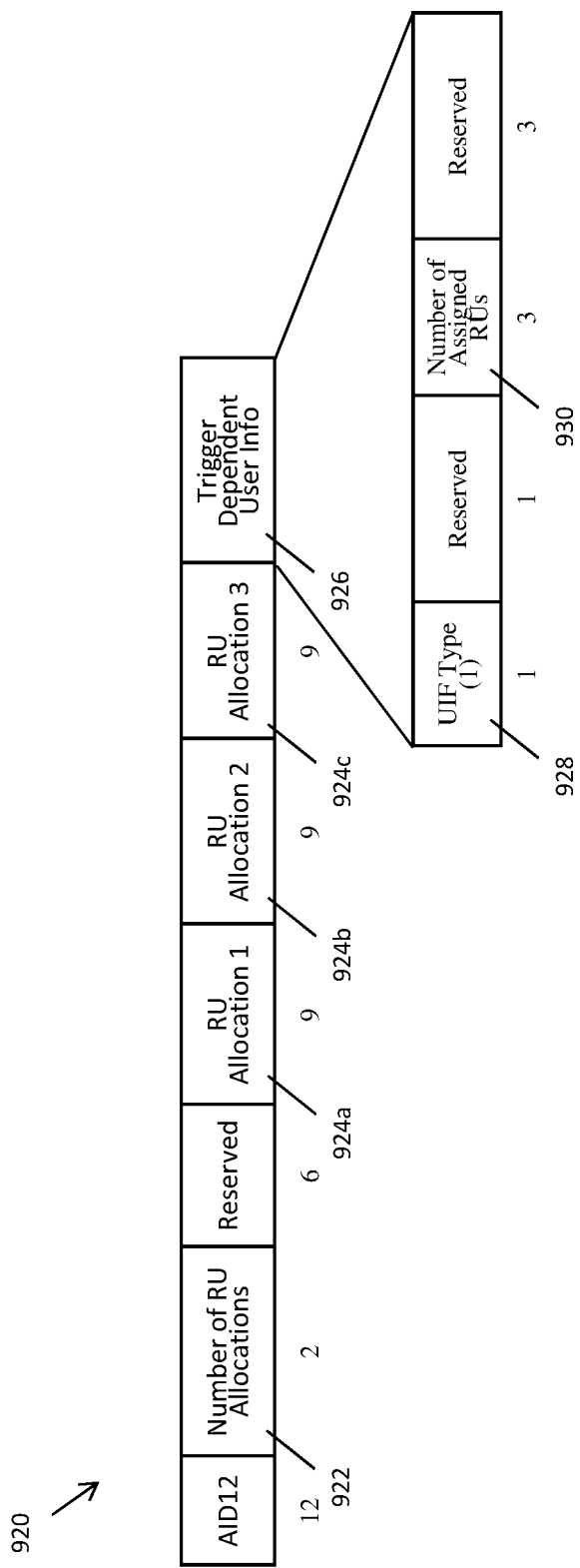
FIG. 9B depicts an example type 2 user info field of the EHT Trigger frame.

FIG. 9B depicts an example type 2 user info field of the EHT Trigger frame 920. A type 2 user info field 920 may include (or consist of) an AID12 subfield, a Number of RU Allocations subfield 922, RU Allocation subfields 924a, 924b, 924c, and a Trigger Dependent User Info subfield 926. The Trigger Dependent User Info field 926 may further comprises an UIF Type subfield (set to 1 to indicate a type 2 user info field) and a Number of Assigned RUs subfield 930. A type 2 user info field does not contain user-specific allocation information and its related fields, and therefore RU Allocation subfields such as RU Allocation subfield 1 924a, RU Allocation subfield 2 924b and RU Allocation subfield 3 924c, can be implemented in the type 2 user info field 920, wherein each RU Allocation subfield may indicate a RU assigned to the STA. The Number of RU Allocations subfield 922 may indicate the number of RU Allocation subfields included in the type 2 user info field 920, in this case the number of RU Allocations subfield 922 is 3 indicating three RU Allocation subfields 924a, 924b, 924c in the user info type 2 user info field 920. The Number of Assigned RUs subfield in the type 2 user info field 920 indicates the number of remaining RUs that are also assigned to the STA other than the three included RUs in the RU Allocation subfields 924a, 924b, 924c.

Table 12 depicts an example User Info List field comprising RU allocations assigned to three STAs, for example STA1, STA2 and STA3, where bandwidth is 20 MHz. The User Info List field may indicate RU allocations such as 52-tone RU1, 26-tone RU3, 26-tone RU4, 26-tone RU5, 52-tone RU3, 26-tone RU8 and 26-tone RU9. One example RU assignment of the seven RUs to three STAs may be as follows: three non-contiguous RUs may be assigned to STA1, for example 52-tone RU1, 52-tone RU3 and 26-tone RU9; a single RU may be assigned to STA2, for example 26-tone RU8; and three contiguous RUs may be assigned to STA3, for example 26-tone RU3, 26-tone RU4 and 26-tone RU5. In this example where type 1 and type 2 user info fields are utilized, the User Info List field may comprise four user info fields, for example UIF1 to UIF4 to carry the RU assignment information of the seven RUs.

Regarding the three non-contiguous RUs assigned to STA1, a type 1 user info field is used as the first user info field address to STA1 (UIF Type subfield=0) and as UF1 in the User Info List field, which contains user-specific allocation information and the first assigned RU information, i.e. 52-tone RU1, in the RU Allocation subfield. Specifically, in the type 1 user info field addressed to STA1, the Contiguous RUs with Same RU Size Flag subfield is set to 0 indicating multiple non-contiguous RUs or multiple contiguous RUs with different RU sizes are assigned to STA1 and the Number of Assigned RUs subfield is set to 2 indicating there are two remaining RUs assigned to STA1. A type 2 user info field is used as any following user info field addressed to STA1 (UIF Type subfield=1) and as UF2 in the User Info List field, which contains the two remaining RUs among the three non-contiguous RUs assigned to STA1, i.e. 52-tone RU3 and 26-tone RU9 in RU Allocation subfield 1 and 2 respectively. Specifically, in the type 2 user info field addressed to STA1, the Number of RU Allocation subfield is set to 2 indicating two RU allocations are included in the type 2 user info field and the Number of Assigned RUs is set to 0 indicating that there are no remaining RUs assigned to STA1.

Regarding the single RU assigned to STA2, a type 1 user info field is used as the first user info field address to STA2 (UIF Type subfield=0) and as UIF3 in the User Info List field, which contains user-specific allocation information and assigned RU information, i.e. 26-tone RU8 in the RU Allocation subfield. Specifically, in the type 1 user info field addressed to STA2, both the Contiguous RUs with Same RU Size Flag subfield and the Number of Assigned RUs are set to 1, indicating a single RU assignment. Regarding the three contiguous RUs assigned to STA3, a type 1 user info field is used as the first user info field addressed to STA3 (UIF Type subfield=0), as UIF4 in the User Info List field which contains user-specific allocation information and the first assigned RU information, i.e. 26-tone RU3, in the RU Allocation subfield. Specifically, in the type 1 user info field addressed to STA3, the Contiguous RUs with Same RU Size Flag subfield is set to 1 indicating multiple contiguous RUs with same RU size is assigned to STA3.

In this case, the Number of Assigned RUs subfield refers to the number of contiguous RUs assigned to the STA which have the same RU size as the assigned RU, the Number of Assigned RUs subfield being set to 3 indicating there are three contiguous RUs with same size are assigned to STA3. As such, it is not required to include the assignment information of the subsequent contiguous RUs of the same RU size in one or more additional user info field, and the channel overhead can be reduced.

Table 13 depicts an example User Info List field comprising RU allocations assigned to four STAs, for example STA1, STA2, STA3 and STA4, where bandwidth is 20 MHz. The User Info List field may indicate RU allocations such as 52-tone RU1, 52-tone RU2, 26-tone RU5, 52-tone RU3, 52-tone RU4, 52-tone RU5, 52-tone RU6, 26-tone RU14, 52-tone RU7 and 52-tone RU8. One example RU assignment of the ten RUs to four STAs may be as follows: three non-contiguous RUs may be assigned to STA1, for example 52-tone RU1, 26-tone RU14 and 52-tone RU8; two non-contiguous RUs may be assigned to STA2, for example 52-tone RU2 and 52-tone RU7; a single RU may be assigned to STA3, for example 26-tone RU5; and four contiguous RUs may be assigned to STA4, for example 52-tone RU3, 52-tone RU4, 52-tone RU5 and 52-tone RU3. In this example where type 1 and type 2 user info fields are utilized, the User Info List field may comprise six user info fields, for example UIF1 to UIF6 to carry the RU assignment information of the ten RUs.

Regarding the three non-contiguous RUs assigned to STA1, a type 1 user info field is used as the first user info field address to STA1 (UIF Type subfield=0), as UIF1 in the User Info List field which contains user-specific allocation information and the first assigned RU information, i.e. 52-tone RU1, in the RU Allocation subfield. Specifically, in the type 1 user info field addressed to STA1, the Contiguous RUs with Same RU Size Flag subfield is set to 0 indicating multiple non-contiguous RUs or multiple contiguous RUs with different RU sizes are assigned to STA1 and the Number of Assigned RUs subfield is set to 2 indicating there are two remaining RUs assigned to STA1. A type 2 user info field is used as any following user info field addressed to STA1 (UIF Type subfield=1) and as UIF2 in the User Info List field, which indicates the two remaining RUs among the three non-contiguous RUs assigned to STA1, i.e. 26-tone RU14 and 52-tone RU8 in RU Allocation subfield 1 and 2 respectively. Specifically, in the type 2 user info field addressed to STA1, the Number of RU Allocation subfield is set to 2 indicating two RU allocations are included in the type 2 user info field and the Number of Assigned RUs is set to 0 indicating that there are no remaining RUs assigned to STA1.

Regarding the two non-contiguous RUs assigned to STA2, a type 1 user info field is used as the first user info field address to STA2 (UIF Type subfield=0) and as UIF3 in the User Info List field, which contains user-specific allocation information and the first assigned RU information, i.e. 52-tone RU2, in the RU Allocation subfield. Specifically, in the type 1 user info field addressed to STA2, the Contiguous RUs with Same RU Size Flag subfield is set to 0 indicating multiple non-contiguous RUs or multiple contiguous RUs with same RU size are assigned to STA2 and the Number of Assigned RUs subfield is set to 1 indicating there is one remaining RU assigned to STA2. A type 2 user info field is used as any following user info field addressed to STA2 (UIF Type subfield=1) and as UIF4 in the User Info List field, which contains the one remaining RU among the two non-contiguous RUs assigned to STA2, i.e. 52-tone RU7 in RU Allocation subfield 1. Specifically, in the type 2 user info field addressed to STA2, the Number of RU Allocation subfield is set to 1 indicating one RU allocation is included in the type 2 user info field and the Number of Assigned RUs is set to 0 indicating that there are no remaining RUs assigned to STA2.

Regarding the single RU assigned to STA3, a type 1 user info field is used as the first user info field address to STA2 (UIF Type subfield=0) and as UIFS in the User Info List field, which contains user-specific allocation information and single assigned RU information, i.e. 26-tone RU5 in the RU Allocation subfield. Specifically, in the type 1 user info field addressed to STA3, both the Contiguous RUs with Same RU Size Flag subfield and the Number of Assigned RUs are set to 1, indicating a single RU assignment. Regarding the four contiguous RUs assigned to STA4, a type 1 user info field is used as the first user info field addressed to STA4 (UIF Type subfield=0) and as UIF6 of the User Info List field, which contains user-specific allocation information and the first assigned RU information, i.e. 52-tone RU3, in the RU Allocation subfield. Specifically, in the type 1 user info field addressed to STA4, the Contiguous RUs with Same RU Size Flag subfield is set to 1 indicating multiple contiguous RUs with same RU size is assigned to STA4. In this case, the Number of Assigned RUs subfield refers to the number of contiguous RUs assigned to the STA which have the same RU size as the assigned RU, the Number of Assigned RUs subfield being set to 4 indicating there are four contiguous RUs with same RU size are assigned to STA3. As such, it is not required to include the assignment information of the subsequent contiguous RUs of the same size in one or more additional user info fields, and the channel overhead can be reduced.

FIG. 10 depicts a flow diagram illustrating processing of a received EHT Trigger frame according to another embodiment. A STA is configured to process the User Info List field in the EHT Trigger frame to search for one or more RUs that are assigned to it. In step 1002, the UIF counter and assigned RU counter may be initialized to 0, the UIF counter counting the number of user info fields in the User Info List field that have been processed. In step 1004, the AID12 subfield of the user info field may be determined if it matches the STA's AID. In response to determining if the AID12 subfield matches the STA's AID, step 1006 is carried out. However, if the AID subfield does not match the STA's AID, the processing is directed to 1026 instead. In step 1006, it is determined if UIF Type subfield of the user info field is set to 0, referring to a type 1 user info field. If the user info field is a type 1 user info field, step 1008 is carried. In step 1008, the assigned RU counter is incremented by 1. In step 1010, an assigned RU is determined from the RU Allocation subfield of the user info field. In step 1012, the user-specific allocation information is then obtained. In step 1014, it is determined if Contiguous RUs with Same RU Size Flag subfield is set to 1. In response to determining the Contiguous RUs with Same RU Size Flag subfield is set to 1, indicating a single RU or multiple contiguous RUs with same RU size are assigned to the STA, step 1016 is carried out. However, if the Contiguous RUs with Same RU Size subfield is set to 0, indicating multiple non-contiguous RUs or multiple contiguous RUs with different RU sizes are assigned to the STA, the processing may be directed to step 1026 instead. In step 1016, it is determined if the Number of Assigned RUs subfield is set to 1. In response to the determining the Number of Assigned RUs subfield is set to 1, in this case indicating if a single RU is assigned to the STA, the processing may end. If the Number of Assigned RUs subfield is not equal to 1, step 1018 is carried out instead. In step 1018, all of remaining assigned RUs are determined from the RU Allocation subfield and the Number of Assigned RUs subfield.

Returning to step 1006, the user info field is a type 2 user info field, step 1020 is carried out instead. In 1020, the assigned RU counter is incremented according to the Number of RU Allocations subfield. In step 1022, one or more remaining assigned RU is determined according to Number of RU Allocations subfields and corresponding one or more RU Allocation subfield. In step 1024, it is determined if the Number of Assigned RUs subfield is set to 0. In response to determining the Number of Assigned RUs subfield is set 0, indicating there is no remaining RUs that are assigned to the STA, the processing may end. If the Number of Assigned RUs subfield is not 0, the process may be directed to step 1026.

In step 1026, the UIF counter is incremented by 1. In step 1028, it is determined if the UIF counter is equal to the total number of user info fields in the EHT Trigger frame. In response to the UIF counter is not equal to the total number of user info fields in the EHT Trigger frame, indicating not all the user info fields in the EHT Trigger frame have been processed, step 1004 is then carried out using the consecutive user info field. However, in step 1028, if the UIF counter equal to the total number of user info fields in the EHT Trigger frame, indicating all the user info fields in the EHT Trigger frame have been processed, the processing of the received EHT Trigger frame may end.

Figure 11:
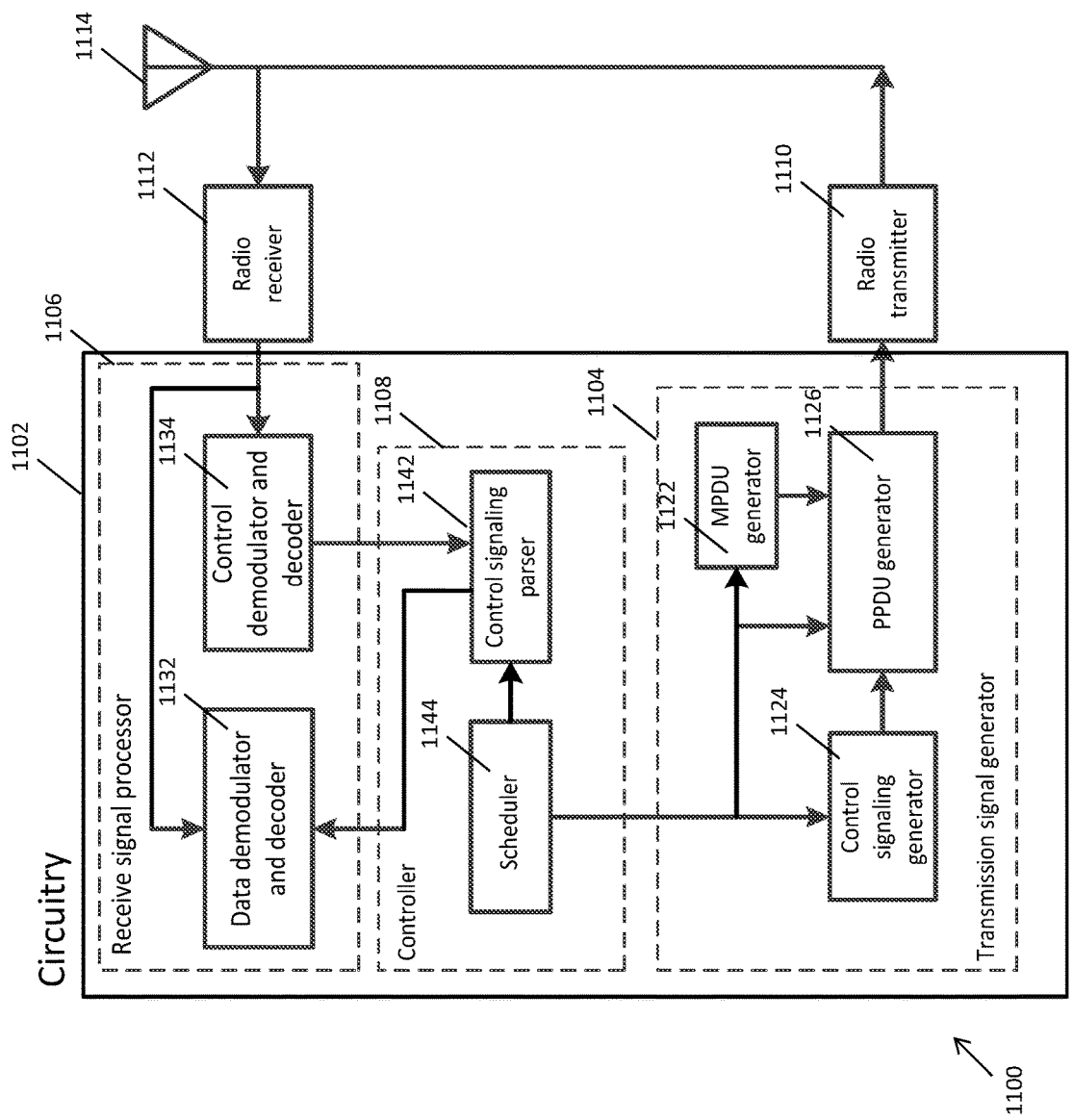
FIG. 11 shows a configuration of a communication device, for example an AP according to various embodiments.

FIG. 11 shows a configuration of a communication device 1100, for example an AP according to various embodiments. Similar to the schematic example of the communication apparatus 300 shown in FIG. 3, the communication apparatus 1100 includes circuitry 1102, at least one radio transmitter 1110, at least one radio receiver 1112, at least one antennas 1114 (for the sake of simplicity, only one antenna is depicted in FIG. 11). The circuitry 1102 may include at least one controller 1108 for use in software and hardware aided execution of tasks that the controller 1108 is designed to perform communication for control singling. The circuitry 1102 may further include a transmission signal generator 1104 and a receive signal processor 1106. The at least one controller 1108 may control the transmission signal generator 1104 and the receive signal processor 1106. The transmission signal generator 1104 may include an MPDU generator 1122, a control signaling generator 1124, and a PPDU generator 1126. The MPDU generator 1122 may generate A-MPDUs, e.g. data frames or EHT Trigger frames. The control signaling generator 1124 may generate control signaling fields of PPDUs to be generated (e.g. EHT-SIG-A and EHT-SIG-B fields of EHT MU PPDUs). The PPDU generator 1126 may generate PPDUs (e.g. EHT MU PPDUs).

The receive signal processor 1106 may include a data demodulator and decoder 1134, which may demodulate and decode data portions of the received signals (e.g. data fields of EHT TB PPDUs). The receive signal processor 1106 may further include a control demodulator and decoder 1134, which may demodulate and decode control signaling portions of the received signals (e.g. EHT-SIG-A fields of EHT TB PPDUs). The at least one controller 1108 may include a control signal parser 1142 and a scheduler 1144. The scheduler 1144 may determine RU information and user-specific allocation information for allocations of downlink MU transmissions and trigger information for allocations of uplink MU transmissions. The control signal parser 1142 may analyse the control signaling portions of the received signals and the trigger information for allocations of uplink MU transmissions shared by the scheduler 1144 and assist the data demodulator and decoder 1132 in demodulating and decoding the data portions of the received signals.

Figure 12:
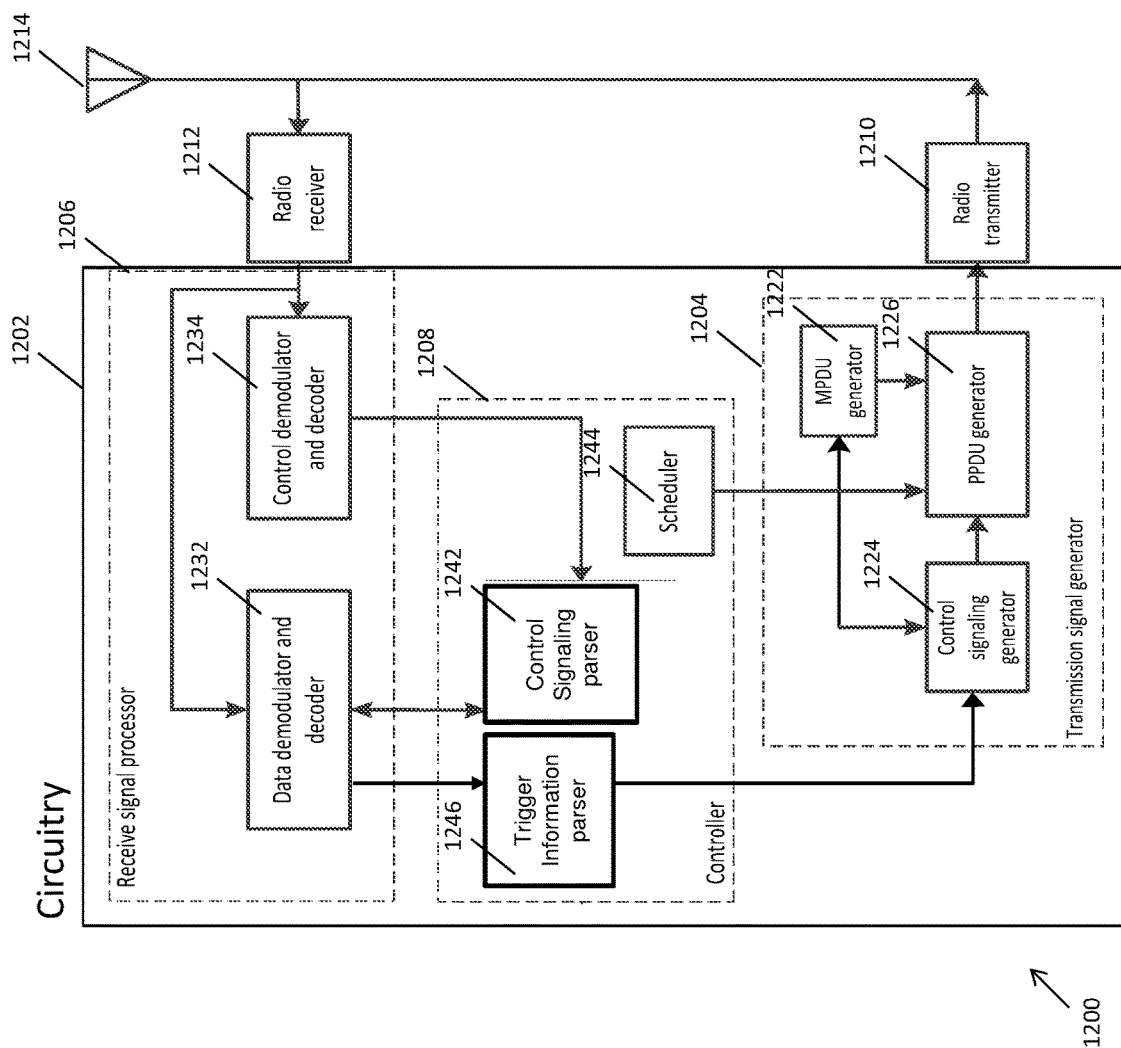
FIG. 12 shows a configuration of a communication device, for example an STA, according to various embodiments.

FIG. 12 shows a configuration of a communication apparatus 1200, for example a STA according to various embodiments. Similar to the schematic example of communication apparatus 300 shown in FIG. 3, the communication apparatus 1200 includes circuitry 1202, at least one radio transmitter 1210, at least one radio receiver 1212, at least one antennas 1214 (for the sake of simplicity, only one antenna is depicted in FIG. 12). The circuitry 1202 may include at least one controller 1208 for use in software and hardware aided execution of tasks that the controller 1208 is designed to perform communication for control signaling. The circuitry 1208 may further include a receive signal processor 1204 and a transmission signal generator 1206. The at least one controller 1208 may control the receive signal processor 1204 and the transmission signal generator 1206. The receive signal processor 1204 may include a data demodulator and decoder 1232 and a control demodulator and decoder 1234. The control demodulator and decoder 1234 may demodulate and decode control signaling portions of the received signals (e.g. EHT-SIG-A and EHT-SIG-B fields of EHT MU PPDUs). The data demodulator and decoder 1232 may demodulate and decode data portions of the received signals (e.g. data fields of EHT MU PPDUs) according to RU information and user-specific allocation information of its own allocations.

The at least one controller 1208 may include a control signal parser 1242, and a scheduler 1244 and a trigger information parser 1246. The control signal parser 1242 may analyse the control signaling portions of the received signals (e.g. EHT-SIG-A and EHT-SIG-B fields of EHT MU PPDUs) and assist the data demodulator and decoder 1932 in demodulating and decoding the data portions of the received signals (e.g. data fields of EHT MU PPDUs). The trigger information parser 1948 may analyse the trigger information for its own uplink allocations from the received Trigger frames (e.g. EHT Trigger frame) in MU communications. The transmission signal generator 1204 may include a control signaling generator 1224, which may generate control signaling fields of PPDUs to be generated (e.g. EHT-SIG-A fields of EHT TB PPDUs). The transmission signal generator 1204 may further include a PPDU generator 1226, which generate PPDUs (e.g. EHT TB PPDUs). The transmission signal generator 1204 may further include an MPDU generator 1222 may generate A-MPDUs, e.g. data frames.

As described above, the embodiments of the present disclosure provide an advanced communication system, communication methods and communication apparatuses for control signalling in MIMO WLAN networks of an extremely high throughput and improve spectral efficiency in MIMO WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, trackfing device), a game console, a digital book reader, a telehealth/ telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

Table 9 indicates an example EHT-SIG-B content channel where bandwidth is 20 MHz.

| User Specific Field | STA ID | UF Type | UF in Different Content Channel Flag | Single RU Assignment Flag | Contiguous RU Assignment Flag | Number of Assigned RUs | RU Position | Next Assigned RU |
|---|---|---|---|---|---|---|---|---|
| UF1 | STA1's ID | 1 | n.a. | n.a. | 0 | 3 | n.a. | 52-tone RU3 |
| UF2 | STA3's ID | 1 | n.a. | n.a. | 1 | 3 | $1^{st}$ RU | n.a. |
| UF3 | STA3's ID | 1 | n.a. | n.a. | 1 | 3 | $2^{nd}$ RU | n.a. |
| UF4 | STA3's ID | 0 | 0 | 0 | n.a. | n.a. | n.a. | n.a. |
| UF5 | STA1's ID | 1 | n.a. | n.a. | 0 | 3 | n.a. | 26-tone RU9 |
| UF6 | STA2's ID | 0 | 0 | 1 | n.a. | n.a. | n.a. | n.a. |
| UF7 | STA1's ID | 0 | 0 | 0 | n.a. | n.a. | n.a. | n.a. |

Table 10 indicates an example EHT-SIG-B content channel 1 where bandwidth is 40 MHz.

| User Specific Field | STA ID | UF Type | UF in Different Content Channel Flag | Single RU Assignment Flag | Contiguous RU Assignment Flag | Number of Assigned RUs | RU Position | Next Assigned RU |
|---|---|---|---|---|---|---|---|---|
| UF1 | STA1's ID | 1 | n.a. | n.a. | 0 | 3 | n.a. | 26-tone RU14 |
| UF2 | STA2's ID | 1 | n.a. | n.a. | 0 | 2 | n.a. | 52-tone RU7 |
| UF3 | STA3's ID | 0 | 0 | 1 | n.a. | n.a. | n.a. | n.a. |
| UF4 | STA4's ID | 1 | n.a. | n.a. | 1 | 4 | $1^{st}$ RU | n.a. |
| UF5 | STA4's ID | 1 | n.a. | n.a. | 1 | 4 | $2^{nd}$ RU | n.a. |

Table 11 indicates an example EHT-SIG-B content channel 2 where bandwidth is 40 MHz.

| User Specific Field | STA ID | UF Type | UF in Different Content Channel Flag | Single RU Assignment Flag | Contiguous RU Assignment Flag | Number of Assigned RUs | RU Position | Next Assigned RU |
|---|---|---|---|---|---|---|---|---|
| UF1 | STA4's ID | 1 | n.a. | n.a. | 1 | 4 | $3^{rd}$ RU | n.a. |
| UF2 | STA4's ID | 0 | 1 | 0 | n.a. | n.a. | n.a. | n.a. |
| UF3 | STA1's ID | 1 | n.a. | n.a. | 0 | 3 | n.a. | 52-tone RU8 |
| UF4 | STA2's ID | 0 | 1 | 0 | n.a. | n.a. | n.a. | n.a. |
| UF5 | STA1's ID | 0 | 1 | 0 | n.a. | n.a. | n.a. | n.a. |

Table 12 indicates an example User Info List field where bandwidth is 20 MHz

| User Info List | UIF Type | AID12 | Number of RU Allocations | RU Allocation subfield | RU Allocation 1 subfield | RU Allocation 2 subfield | RU Allocation 3 subfield | Contiguous RUs with Same RU Size Flag subfield | Number of Assigned RUs |
|---|---|---|---|---|---|---|---|---|---|
| UIF1 | 0 | STA1's AID | n.a. | 52-tone RU1 | n.a. | n.a. | n.a. | 0 | 2 |
| UIF2 | 1 | STA1's AID | 2 | n.a. | 52-tone RU3 | 26-tone RU9 | n.a. | n.a. | 0 |
| UIF3 | 0 | STA2's AID | n.a. | 26-tone RU8 | n.a. | n.a. | n.a. | 1 | 1 |
| UIF4 | 0 | STA3's AID | n.a. | 26-tone RU3 | n.a. | n.a. | n.a. | 1 | 3 |

Table 13 indicates an example User Info List field where bandwidth is 40 MHz.

| User Info List | UIF Type | AID12 | Number of RU Allocations | RU Allocation subfield | RU Allocation 1 subfield | RU Allocation 2 subfield | RU Allocation 3 subfield | Contiguous RUs with Same RU Size Flag subfield | Number of Assigned RUs |
|---|---|---|---|---|---|---|---|---|---|
| UIF1 | 0 | STA1's AID | n.a. | 52-tone RU1 | n.a. | n.a. | n.a. | 0 | 2 |
| UIF2 | 1 | STA1's AID | 2 | n.a. | 26-tone RU14 | 52-tone RU8 | n.a. | n.a. | 0 |
| UIF3 | 0 | STA2's AID | n.a. | 52-tone RU2 | n.a. | n.a. | n.a. | 0 | 1 |
| UIF4 | 1 | STA2's AID | 1 | n.a. | 52-tone RU7 | n.a. | n.a. | n.a. | 0 |
| UIF5 | 0 | STA3's AID | n.a. | 26-tone RU5 | n.a. | n.a. | n.a. | 1 | 1 |
| UIF6 | 0 | STA4's AID | n.a. | 52-tone RU3 | n.a. | n.a. | n.a. | 1 | 4 |

The invention claimed is:

1. A communication apparatus, comprising:
a transmitter, which, in operation, transmits a trigger frame comprising a user field that contains an association identifier 12 (AID12) subfield and a signaling indicating multiple resource units (RUs); and
a receiver, which, in operation, receives, from a station identified by the AID12 subfield, a trigger based (TB) physical layer protocol data unit (PPDU) transmitted using the multiple RUs,
wherein if first multiple contiguous RUs are as large as a single RU and fit into the single RU in a frequency domain, the first multiple contiguous RUs are not allocated to a station.

2. The communication apparatus according to claim 1, wherein the multiple RUs have a same RU size.

3. The communication apparatus according to claim 1, wherein the multiple RUs have different RU sizes.

4. The communication apparatus according to claim 1, wherein the multiple RUs are multiple contiguous RUs.

5. The communication apparatus according to claim 1, wherein the multiple RUs are multiple non-contiguous RUs.

6. The communication apparatus according to claim 1, wherein the multiple RUs are indicated by a set of two subfields in the user field.

7. The communication apparatus according to claim 1, wherein the trigger frame comprises a first type user field and a second type user field, and the second type user field does not carry a portion of user specific information, wherein said portion is carried in the first type user field.

8. A communication method, comprising:
transmitting a trigger frame comprising a user field that contains an association identifier 12 (AID12) subfield and a signaling indicating multiple resource units (RUs); and
receiving, from a station identified by the AID12 subfield, a trigger based (TB) physical layer protocol data unit (PPDU) transmitted using the multiple RUS,
wherein if first multiple contiguous RUs are as large as a single RU and fit into the single RU in a frequency domain, the first multiple contiguous RUs are not allocated to a station.

* * * * *